United States Patent
Lv et al.

(10) Patent No.: US 12,429,352 B2
(45) Date of Patent: Sep. 30, 2025

(54) METHOD FOR GENERATING WORKING MAP, OPERATION METHOD, CONTROL METHOD, AND RELATED APPARATUSES

(71) Applicant: WILLAND (BEIJING) TECHNOLOGY CO., LTD., Beijing (CN)

(72) Inventors: Zhuo Lv, Beijing (CN); Chunhong Li, Beijing (CN); Tianning Yu, Beijing (CN); Shuai Li, Beijing (CN); Weijie Tang, Beijing (CN)

(73) Assignee: WILLAND (BEIJING) TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/998,529

(22) PCT Filed: May 24, 2024

(86) PCT No.: PCT/CN2024/095199
§ 371 (c)(1),
(2) Date: Jan. 27, 2025

(87) PCT Pub. No.: WO2025/044326
PCT Pub. Date: Mar. 6, 2025

(65) Prior Publication Data
US 2025/0264339 A1 Aug. 21, 2025

(30) Foreign Application Priority Data
Aug. 31, 2023 (CN) .......................... 202311117360.5

(51) Int. Cl.
*G01C 21/00* (2006.01)
*A01D 34/00* (2006.01)
*A01D 101/00* (2006.01)

(52) U.S. Cl.
CPC ........ *G01C 21/3811* (2020.08); *A01D 34/008* (2013.01); *A01D 2101/00* (2013.01)

(58) Field of Classification Search
None
See application file for complete search history.

(56) References Cited

U.S. PATENT DOCUMENTS

| 6,363,161 B2 * | 3/2002 | Laumeyer | G06V 20/582 |
| | | | 382/104 |
| 2019/0279119 A1 * | 9/2019 | Hirose | G06Q 50/40 |

(Continued)

FOREIGN PATENT DOCUMENTS

| CN | 105867368 A | 8/2016 |
| CN | 108334080 A | 7/2018 |

(Continued)

OTHER PUBLICATIONS

International Search Report in the international application No. PCT/CN2024/095199, mailed on Aug. 19, 2024, 4 pages.

(Continued)

*Primary Examiner* — Daniel L Greene
*Assistant Examiner* — Robert L Pinkerton
(74) *Attorney, Agent, or Firm* — Cooper Legal Group, LLC

(57) ABSTRACT

Embodiments of the application provide a method for generating a working map, an operation method, a control method, and a related apparatus. The method for generating a working map includes the following operations. The automatic operation apparatus is controlled to move, to record position information of multiple path points on a movement path of the automatic operation apparatus. Boundary attribute configuration information is received, and boundary attributes of at least a part of the path points are determined according to the boundary attribute configu- (Continued)

ration information. A working map including position information of multiple boundary points and boundary attributes of at least a part of the boundary points is generated. The position information of multiple boundary points are determined according to the position information of multiple path points, the boundary attribute of the boundary point is determined according to the boundary attribute of the path point, multiple boundary points are configured to indicate a virtual boundary surrounding a preset area, and when the automatic operation apparatus performs operations along the virtual boundary, working modes when the automatic operation apparatus moves to boundary points corresponding to different boundary attributes are different. This solution may improve work efficiency of the automatic operation apparatus.

34 Claims, 6 Drawing Sheets

(56) References Cited

U.S. PATENT DOCUMENTS

| | | | |
|---|---|---|---|
| 2019/0314991 A1* | 10/2019 | Liu | B25J 9/1666 |
| 2021/0064043 A1 | 3/2021 | Kulkarni et al. | |
| 2022/0124973 A1 | 4/2022 | Juel | |

FOREIGN PATENT DOCUMENTS

| | | |
|---|---|---|
| CN | 112308076 A | 2/2021 |
| CN | 112445221 A | 3/2021 |
| CN | 113671949 A | 11/2021 |
| CN | 114529735 A | 5/2022 |
| CN | 114911228 A | 8/2022 |
| CN | 114942644 A | 8/2022 |
| CN | 115454077 A | 12/2022 |
| CN | 115494834 A | 12/2022 |
| CN | 115540852 A | 12/2022 |
| CN | 116295357 A | 6/2023 |
| CN | 116295497 A | 6/2023 |
| CN | 116841300 A | 10/2023 |
| DE | 102018121335 A1 | 2/2019 |
| KR | 102467855 B1 | 11/2022 |
| WO | 2014032569 A1 | 3/2014 |
| WO | 2021212731 A1 | 10/2021 |

OTHER PUBLICATIONS

Supplementary Partial European Search Report in the European application No. 24837833.3, mailed on May 8, 2025. 16 pages.

* cited by examiner

METHOD FOR GENERATING WORKING MAP, OPERATION METHOD, CONTROL METHOD, AND RELATED APPARATUSES

CROSS-REFERENCE TO RELATED APPLICATION

This application claims priority to Chinese patent application No. 202311117360.5 filed on Aug. 31, 2023 and entitled "METHOD FOR GENERATING WORKING MAP, OPERATION METHOD, CONTROL METHOD, AND RELATED APPARATUS", the disclosure of which is hereby incorporated by reference in its entirety.

TECHNICAL FIELD

Embodiments of the disclosure relate to the technical field of automation, and in particular to a method for generating a working map, an operation method, a control method, and a related apparatus.

BACKGROUND

With the continuous development of science and technology, automation devices are more and more widely applied to daily life, such as an automatic sweeping robot, or an automatic lawn mower, etc.

At present, the automatic lawn mower performs mowing operations in a predetermined work area, and when the automatic lawn mower performs mowing operations at a boundary of the work area, the automatic lawn mower generally adopts a preset working mode to mow grass, for example, to mow grass close to the boundary of the work area in the boundary of the work area, etc.

However, since actual work environments are complex and changeable, and the automatic lawn mower adopts a single working mode when it performs the mowing operations at the boundary of the work area, there may be a situation where the automatic lawn mower fails to clean the grass in at least a part of the boundary of the work area, and then the automatic lawn mower often needs to rework to mow grass, which reduces work efficiency of the automatic lawn mower.

SUMMARY

In view of the above, embodiments of the disclosure provide a method for generating a working map, an operation method, a control method, and a related apparatus, to at least partially solve the above problem.

According to a first aspect of the embodiments of the disclosure, there is provided a method for generating a working map, the method is applied to an automatic operation apparatus, and the method includes the following operations. The automatic operation apparatus is controlled to move, to record, by the automatic operation apparatus, position information of a plurality of path points on a movement path of the automatic operation apparatus. Boundary attribute configuration information is received, and boundary attributes of at least a part of a plurality of path points are determined according to the boundary attribute configuration information. A working map including position information of a plurality of boundary points and boundary attributes of at least a part of the boundary points is generated. The position information of a plurality of boundary points are determined according to the position information of a plurality of path points, the boundary attribute of the boundary point is determined according to the boundary attribute of the path point, a plurality of boundary points are configured to indicate including a virtual boundary surrounding a preset area, and when the automatic operation apparatus performs operations along the virtual boundary according to the working map, working modes when the automatic operation apparatus moves to boundary points corresponding to different boundary attributes are different.

According to a second aspect of the embodiments of the disclosure, there is provided an operation method, the method is applied to an automatic operation apparatus, and the method includes the following operations. A working map is acquired, the working map includes position information of a plurality of boundary points and boundary attributes of at least a part of the boundary points, and a plurality of boundary points are configured to indicate a virtual boundary surrounding a preset area. The automatic operation apparatus is controlled to perform operations along the virtual boundary according to the working map, and when the automatic operation apparatus moves to a boundary point with a boundary attribute, the automatic operation apparatus is controlled to perform operations in a corresponding working mode according to the boundary attribute of the boundary point. Working modes when the automatic operation apparatus moves to boundary points corresponding to different boundary attributes are different.

According to a third aspect of the embodiments of the disclosure, there is provided a method for controlling an automatic operation apparatus, the method is applied to a control device external to the automatic operation apparatus, and the method includes the following operations. Boundary attribute configuration information is sent to the automatic operation apparatus. A motion control instruction is sent to the automatic operation apparatus, to instruct the automatic operation apparatus to move, to enable the automatic operation apparatus to record position information of a plurality of path points on a movement path, and determine, according to the boundary attribute configuration information, boundary attributes of at least a part of a plurality of path points, and generate a working map including position information of a plurality of boundary points and boundary attributes of at least a part of the boundary points. The position information of a plurality of boundary points are determined according to the position information of a plurality of path points, the boundary attribute of the boundary point is determined according to the boundary attribute of the path point, a plurality of boundary points are configured to indicate including a virtual boundary surrounding a preset area, and when the automatic operation apparatus performs operations along the virtual boundary according to the working map, working modes when the automatic operation apparatus moves to boundary points corresponding to different boundary attributes are different.

According to a fourth aspect of the embodiments of the disclosure, there is provided an automatic operation apparatus, the automatic operation apparatus includes a motion control unit, an information receiving unit and a map generation unit. The motion control unit is configured to control the automatic operation apparatus to move, to record, by the automatic operation apparatus, position information of a plurality of path points on a movement path of the automatic operation apparatus. The information receiving unit is configured to receive boundary attribute configuration information, and determine, according to the boundary attribute configuration information, boundary attributes of at least a part of a plurality of path points. The map generation unit is configured to generate a working map including position information of a plurality of boundary points and boundary attributes of at least a part of the boundary points. The position information of a plurality of boundary points are determined according to the position information of a plurality of path points, the boundary attribute of the boundary point is determined according to the boundary attribute of the path point, a plurality of boundary points are configured to indicate including a virtual boundary surrounding a preset area, and when the automatic operation apparatus performs operations along the virtual boundary according to the working map, working modes when the automatic operation apparatus moves to boundary points corresponding to different boundary attributes are different.

According to a fifth aspect of the embodiments of the disclosure, there is provided an automatic operation apparatus, the automatic operation apparatus includes a map acquisition unit and an operation control unit. The map acquisition unit is configured to acquire a working map, the working map includes position information of a plurality of boundary points and boundary attributes of at least a part of the boundary points, and a plurality of boundary points are configured to indicate a virtual boundary surrounding a preset area. The operation control unit is configured to control the automatic operation apparatus to perform operations along the virtual boundary according to the working map, and when the automatic operation apparatus moves to a boundary point with a boundary attribute, control the automatic operation apparatus to perform operations in a corresponding working mode according to the boundary attribute of the boundary point. Working modes when the automatic operation apparatus moves to boundary points corresponding to different boundary attributes are different.

According to a sixth aspect of the embodiments of the disclosure, there is provided a control device of an automatic operation apparatus, the control device includes a first sending unit and a second sending unit. The first sending unit is configured to send boundary attribute configuration information to the automatic operation apparatus. The second sending unit is configured to send a motion control instruction to the automatic operation apparatus, to instruct the automatic operation apparatus to move, to enable the automatic operation apparatus to record position information of a plurality of path points on a movement path, and determine, according to the boundary attribute configuration information, boundary attributes of at least a part of a plurality of path points, and generate a working map including position information of a plurality of boundary points and boundary attributes of at least a part of the boundary points. The position information of a plurality of boundary points are determined according to the position information of a plurality of path points, the boundary attribute of the boundary point is determined according to the boundary attribute of the path point, a plurality of boundary points are configured to indicate including a virtual boundary surrounding a preset area, and when the automatic operation apparatus performs operations along the virtual boundary according to the working map, working modes when the automatic operation apparatus moves to boundary points corresponding to different boundary attributes are different.

According to a seventh aspect of the embodiments of the disclosure, there is provided an electronic device, the electronic device includes a processor, a memory, a communication interface and a communication bus. Mutual communication among the processor, the memory and the communication interface is implemented through the communication bus. The memory is configured to store at least one executable instruction which enables the processor to perform operations corresponding to the above method of the first aspect, the second aspect or the third aspect.

According to an eighth aspect of the embodiments of the disclosure, there is provided a computer storage medium, the computer storage medium has stored thereon a computer program. The program is executed by a processor to perform the above method of the first aspect, the second aspect or the third aspect.

According to a ninth aspect of the embodiments of the disclosure, there is provided a computer program product, the computer program product includes computer instructions which instruct a computing device to perform the above method of the first aspect, the second aspect or the third aspect.

According to the solution of generating a working map provided in the embodiments of the disclosure, in a process of controlling the automatic operation apparatus to move, position information of multiple path points on a movement path are collected, and boundary attributes of at least a part of the path points are determined, to generate a working map including position information of multiple boundary points and boundary attributes of at least a part of the boundary points according to the position information of multiple path points and the boundary attributes of at least the part of the path points, and multiple boundary points are configured to indicate a virtual boundary. In this way, since working modes when the automatic operation apparatus moves to boundary points corresponding to different boundary attributes are different, setting of the boundary attributes may enable different working modes to be adopted when the automatic operation apparatus moves to at least a part of different positions of the virtual boundary to perform operations, so that the automatic operation apparatus may process areas near the virtual boundary, to reduce a possibility of requiring reworking operations. Therefore, work efficiency of the automatic operation apparatus may be improved, and individual demand of a user for operation effect of the automatic operation apparatus may also be met.

BRIEF DESCRIPTION OF THE DRAWINGS

In order to explain technical solutions in the embodiments of the disclosure or the related art more clearly, drawings required to be used in descriptions of the embodiments or the related art will be briefly introduced below. It is apparent that the drawings in the following descriptions are only some embodiments recorded in the embodiments of the disclosure, and other drawings may also be obtained by those of ordinary skill in the art according to these drawings.

DETAILED DESCRIPTION

In order to enable those skilled in the art to understand the technical solutions in the embodiments of the disclosure better, the technical solutions in the embodiments of the disclosure will be clearly and completely described below with reference to the drawings in the embodiments of the disclosure, and it is apparent that the described embodiments are only part of the embodiments of the disclosure, rather than all the embodiments. Based on the embodiments in the embodiments of the disclosure, all other embodiments obtained by those of ordinary skill in the art should fall within the scope of protection of the embodiments of the disclosure.

A method for generating a working map and an operation method in each of the following embodiments may be applied to an automatic operation apparatus such as an automatic mowing apparatus, a sweeping robot, etc. The method for generating a working map and the operation method will be respectively described below by taking their application to the automatic mowing apparatus as an example. It should be noted that in order to be able to describe specific implementations of the method for generating a working map and the operation method in combination with application scenarios, the following embodiments illustrate the method for generating a working map and the operation method in an adaptive and scenario-oriented manner, such as a scenario-adaptive description in which a mowing path is an operation path, a scenario-adaptive description in which a lawn physical boundary is an physical boundary, etc.

An embodiment of the disclosure provides a method for generating a working map, and the method for generating a working map will be described in detail below with reference to multiple embodiments. A working process of the automatic mowing apparatus usually includes two stages, that is, a working map establishment stage and a mowing operation stage. In the working map establishment stage, the automatic mowing apparatus usually works by using the above method for generating a working map.

Figure 1:
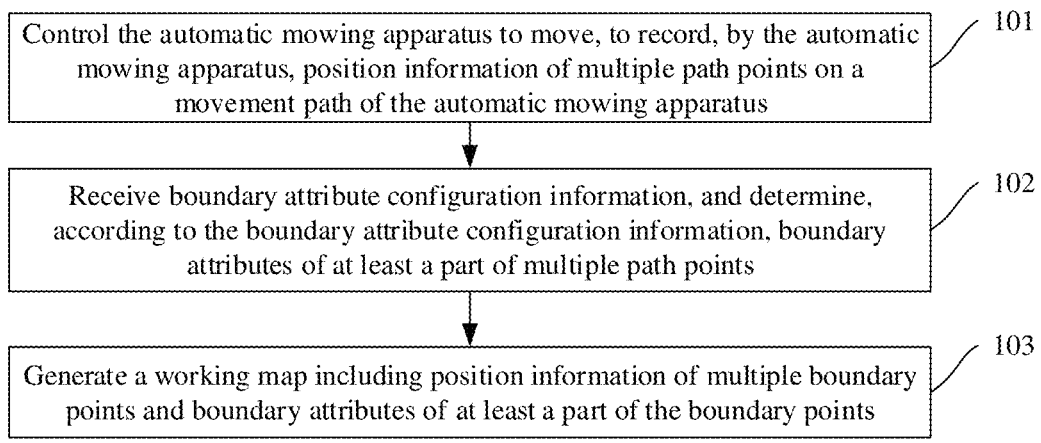
FIG. 1 is a flowchart of a method for generating a working map according to an embodiment of the disclosure.

FIG. 1 is a flowchart of a method for generating a working map according to an embodiment of the disclosure. As shown in FIG. 1, the method for generating a working map includes the following operations 101 to 103.

In operation 101, an automatic mowing apparatus is controlled to move, to record, by the automatic mowing apparatus, position information of multiple path points on a movement path of the automatic mowing apparatus.

The automatic mowing apparatus may be controlled to move along a boundary of a to-be-mowed area from a movement starting point, and record the position information of multiple path points on the movement path of the automatic mowing apparatus. The movement starting point may be located on the boundary of the to-be-mowed area, or at a position close to the boundary of the to-be-mowed area, etc. The to-be-mowed area is an application scenario of the automatic mowing apparatus, and usually is a lawn or an area in the lawn. Preferably, the to-be-mowed area is a lawn of 400 to 500 square meters.

In a specific example, the automatic mowing apparatus may be controlled to move along an outer boundary of the to-be-mowed area from the movement starting point, and record the position information of multiple path points on the movement path of the automatic mowing apparatus. In another specific example, the automatic mowing apparatus may be controlled to move along an inner boundary of the to-be-mowed area from the movement starting point, that is, move along an outer boundary of a forbidden zone such as a flower bed area, or an obstacle area, or the like in the to-be-mowed area, and record the position information of multiple path points on the movement path of the automatic mowing apparatus. Preferably, the movement path of the automatic mowing apparatus may be a closed path connected end-to-end.

With respect to controlling the automatic mowing apparatus to move along the boundary of the to-be-mowed area from the movement starting point, a specific implementation may be that an operator remotely controls, through a remote control button on an application program, the automatic mowing apparatus to move along the boundary of the to-be-mowed area from the movement starting point, and another specific implementation may be that the automatic mowing apparatus automatically moves along the boundary of the to-be-mowed area from the movement starting point, according to a boundary of a mowing area recognized by a sensor.

A specific implementation of recording the position information of multiple path points may be that in a process of controlling the automatic mowing apparatus to move, coordinate information of a position where the automatic mowing apparatus is located at present is periodically acquired as position information of one path point. Another specific implementation of recording the position information of multiple path points may be that in a process of controlling the automatic mowing apparatus to move, every time the automatic mowing apparatus moves by a preset unit distance, coordinate information of a position where the automatic mowing apparatus is located at present is collected as position information of one path point. For example, in the process of controlling the automatic mowing apparatus to move, when the automatic mowing apparatus moves to a position where a movement distance from the starting point is 2 cm, 4 cm, 6 cm, 8 cm . . . , the coordinate information of the position where the automatic mowing apparatus is located at present is collected, the preset unit distance is 2 cm at this time.

The coordinate information may be two-dimensional rectangular coordinate information with the movement starting point as an origin, or longitude and latitude coordinate information, etc. The position where the automatic mowing apparatus is located at present may be a position where any point in the automatic mowing apparatus is located. For example, the automatic mowing apparatus is provided with a roller at both sides of a forward direction of the automatic mowing apparatus respectively, and the position where the automatic mowing apparatus is located at present may be a midpoint of a line connecting center points of two rollers of the automatic mowing apparatus.

In operation 102, boundary attribute configuration information is received, and boundary attributes of at least a part of multiple path points are determined according to the boundary attribute configuration information.

In the process of controlling the automatic mowing apparatus to move, boundary attribute configuration information sent by a control module may be received, and the boundary attributes of at least a part of the path points may be determined according to the received boundary attribute configuration information. The control module may send the boundary attribute configuration information in response to automatic trigger set by a program, or in response to manual trigger of a user. The control module may be installed inside the automatic mowing apparatus, or may be a device external to the automatic mowing apparatus, which is not limited in the embodiments of the disclosure.

The boundary attribute configuration information may be sent to the automatic mowing apparatus by the control module in response to manual trigger of the operator, or may be automatically sent to the automatic mowing apparatus by the control module according to a preset rule. For example, when the automatic mowing apparatus recognizes a clear boundary, the control module sends boundary attribute configuration information configured to indicate 'a boundary attribute' to the automatic mowing apparatus, and when the automatic mowing apparatus recognizes an unclear boundary, the control module sends boundary attribute configuration information configured to indicate 'b boundary attribute' to the automatic mowing apparatus, the a boundary attribute is different from the b boundary attribute.

Since the automatic mowing apparatus usually has a height of about 35 cm, the automatic mowing apparatus is close to the ground, so that the field of view when the automatic mowing apparatus recognizes is limited, and there are many blind areas. Therefore, compared to automatically sending the boundary attribute configuration information to the automatic mowing apparatus by the control module according to the preset rule, it is more reliable for the control module to send the boundary attribute configuration information to the automatic mowing apparatus in response to manual trigger of the operator, and reliability of receiving the boundary attribute configuration information is improved.

The above operations 101 and 102 may be two parallel operations, or may be two sequential-performed operations, that is, the boundary attributes of at least a part of the path points may be determined in a process of collecting the position information of multiple path points, or the boundary attributes of at least a part of the path points may be determined after the position information of multiple path points are collected, which is not limited in the embodiments of the disclosure.

In operation 103, a working map including position information of multiple boundary points and boundary attributes of at least a part of the boundary points is generated.

The position information of multiple boundary points are determined according to the position information of multiple path points, the boundary attribute of the boundary point is determined according to the boundary attribute of the path point, multiple boundary points are configured to indicate including a virtual boundary surrounding a preset area.

In the process of controlling the automatic mowing apparatus to move, when the movement path of the automatic mowing apparatus forms a closed path connected end-to-end, collection of position information of the path points in this round is finished. The position information of the path points collected in this round is pre-processed such as filtered, fitted and/or deleted, etc., to obtain the position information of multiple boundary points, at least a part of the boundary points are path points among path points from which the position information is collected in this round. Two adjacent boundary points are sequentially connected according to the above position information of multiple boundary points, to draw a virtual boundary. With respect to at least a part of boundary points in the virtual boundary, position information of the boundary points is bound to boundary properties they have. Finally, the working map including position information of multiple boundary points and boundary attributes of at least a part of the boundary points may be generated.

With respect to the preset area, when the position information of the path points collected in this round are collected in a process of the automatic mowing apparatus moving along the outer boundary of the to-be-mowed area, the virtual boundary is an outer boundary of the preset area, that is, an area within the virtual boundary is the preset area; and when this group of path points are collected in a process of the automatic mowing apparatus moving along the inner boundary of the to-be-mowed area, the virtual boundary is an inner boundary of the preset area, that is, an area outside the virtual boundary is the preset area. The inner boundary of the to-be-mowed area is an outer boundary of a forbidden zone such as a flower bed area, or an obstacle area, or the like in the to-be-mowed area.

The above pre-processing may make lines of the virtual boundary smoother and have fewer inflection points, so that the automatic mowing apparatus may turn more smoothly when it performs mowing operations along the virtual boundary, to improve operation efficiency.

Compared to generating the working map after the position information of the path points are collected and then configuring boundary attributes for different boundary points in the working map, in the disclosure, the boundary attributes of at least a part of the path points are determined in a process of collecting the position information of multiple path points, and the working map is generated based on the position information of multiple path points and the boundary attributes of at least a part of the path points, which may reduce a possibility of erroneous boundary attribute configuration caused by misplacement of a starting point of attribute configuration or other reasons, and thus may further improve accuracy of the boundary attribute configuration, and may also improve a matching degree between the boundary attributes and an actual environment.

When the automatic mowing apparatus performs mowing operations along the virtual boundary according to the working map, working modes when the automatic mowing apparatus moves to boundary points corresponding to different boundary attributes are different. Specifically, when the automatic mowing apparatus performs mowing operations along the virtual boundary according to the working map, a working mode when the automatic mowing apparatus moves to a boundary segment in the virtual boundary where boundary points corresponding to different boundary attributes are located is different.

If each boundary point has a boundary attribute, with respect to each boundary point in the virtual boundary, a boundary segment where the boundary point is located is a part between the boundary point and a next adjacent boundary point in the virtual boundary; or with respect to each boundary point in the virtual boundary, a boundary line where the boundary point is located is a part between the boundary point and a next adjacent boundary point in the virtual boundary. If a part of boundary points have boundary attributes respectively, with respect to each boundary point with a respective boundary attribute in the virtual boundary, a boundary segment where the boundary point is located is a part between the boundary point and a first boundary point with a boundary attribute after the path point in the virtual boundary.

In the embodiment of the disclosure, in the process of controlling the automatic mowing apparatus to move, position information of multiple path points on a movement path are collected, and boundary attributes of at least a part of the path points are determined, to generate a working map including position information of multiple boundary points and boundary attributes of at least a part of the boundary points according to the position information of multiple path points and the boundary attributes of at least the part of the path points, and multiple boundary points are configured to indicate a virtual boundary. In this way, since working modes when the automatic mowing apparatus moves to boundary points corresponding to different boundary attributes are different, setting of the boundary attributes may enable different working modes to be adopted when the automatic mowing apparatus moves to at least a part of different positions of the virtual boundary to perform mowing operations, so that the automatic mowing apparatus may clean grass near the virtual boundary cleaner, to reduce a possibility of requiring reworked mowing. Therefore, work efficiency of the automatic mowing apparatus may be improved, and individual demand of the user for mowing effect of the automatic mowing apparatus may also be met.

In a possible implementation, specific processing included in the above operation 102 may be as follows. With respect to each path point, when the path point is determined by the automatic mowing apparatus, a boundary attribute indicated by most recently received boundary attribute configuration information is determined as the boundary attribute of the path point.

In the embodiment of the disclosure, when each path point is determined, the boundary attribute indicated by the most recently received boundary attribute configuration information is determined as the boundary attribute of the path point, so that each collected path point may have a respective boundary attribute, and compared to a part of collected path points with boundary attributes respectively, each collected path point with a respective boundary attribute may make the boundary attribute of the boundary point more accurate. Therefore, when the automatic mowing apparatus moves to the virtual boundary to perform mowing operations, accuracy of determining a working mode adopted by the automatic mowing apparatus can be improved, a possibility of errors in determining the working mode can be reduced, and thus a possibility of requiring reworked mowing can be reduced, further improving efficiency of the automatic mowing apparatus.

Based on this, when the boundary attributes of the boundary points are determined, boundary attributes of all the boundary points may be determined, or boundary attributes of a part of the boundary points may be determined, which is not limited in the embodiments of the disclosure.

Specific processing of determining the boundary attributes of all the boundary points may be as follows. With respect to each boundary point, it is determined whether the boundary point is any path point, and if the boundary point is any path point, a boundary attribute of the path point is used as the boundary attribute of the boundary point; otherwise, a boundary attribute of a path point closest to the boundary point is used as the boundary attribute of the boundary point. Based on this, the boundary attributes of all the boundary points can be obtained.

Specific processing of determining the boundary attributes of a part of the boundary points may be as follows. Boundary attribute determination processing is sequentially performed on each boundary point according to an order in which the boundary points are arranged in the virtual boundary along a boundary direction of the virtual boundary, and when boundary attribute determination processing is performed on a first boundary point in the virtual boundary, it is determined whether the boundary point is any path point, and if the boundary point is any path point, a boundary attribute of the path point is used as the boundary attribute of the boundary point; otherwise, a boundary attribute of a path point closest to the boundary point is used as the boundary attribute of the boundary point. When boundary attribute determination processing is performed on each boundary point after the first boundary point in the virtual boundary, if the boundary point is any path point, it is determined whether a boundary attribute of the path point is the same as a boundary attribute of a previous boundary point of the boundary point, and if the boundary attribute of the path point is the same as the boundary attribute of the previous boundary point of the boundary point, it is determined that the boundary point does not have a boundary attribute, otherwise, the boundary attribute of the path point is used as the boundary attribute of the boundary point; if each of all path points is not the boundary point, it is determined whether a boundary attribute of a path point closest to the boundary point is the same as the boundary attribute of the previous boundary point of the boundary point, and if the boundary attribute of the path point closest to the boundary point is the same as the boundary attribute of the previous boundary point of the boundary point, it is determined that the boundary point does not have a boundary attribute, otherwise, the boundary attribute of the path point closest to the boundary point is used as the boundary attribute of the boundary point. Based on this, the boundary attributes of a part of the boundary points can be obtained.

The boundary direction of the virtual boundary is a direction along the virtual boundary from a path point with an earlier corresponding collection time to a path point with a later corresponding collection time, and the corresponding collection time of the path point is a time when the automatic mowing apparatus records position information of the path point, that is, path points on the virtual boundary are arranged along the boundary direction of the virtual boundary in an order from earlier to later corresponding collection times.

In another possible implementation, specific processing included in the above operation 102 may be as follows. With respect to each boundary attribute configuration information, after the boundary attribute configuration information is received, a boundary attribute of a first path point determined after the boundary attribute configuration information is received is determined as a boundary attribute indicated by the boundary attribute configuration information.

In the embodiment of the disclosure, after each boundary attribute configuration information is received, the boundary attribute of the first path point determined after the boundary attribute configuration information is received is determined as the boundary attribute indicated by the boundary attribute configuration information, so that a part of collected path points may have boundary attributes respectively, and compared to each collected path point with a respective boundary attribute, a part of collected path points with boundary attributes respectively can reduce an amount of data transmission and save storage space.

Based on this, when the boundary attributes of the boundary points are determined, the boundary attributes of all the boundary points may be determined, or the boundary attributes of a part of the boundary points may be determined, which is not limited in the embodiments of the disclosure.

Specific processing of determining the boundary attributes of all the boundary points may be as follows. With respect to each boundary point, it is determined whether the boundary point is any path point with a boundary attribute, and if the boundary point is any path point with a boundary attribute, a boundary attribute of the path point is used as the boundary attribute of the boundary point; otherwise, a boundary attribute of a path point closest to the boundary point is used as the boundary attribute of the boundary point. Based on this, the boundary attributes of all the boundary points may be obtained.

Specific processing of determining the boundary attributes of a part of the boundary points may be as follows. Boundary attribute determination processing is sequentially performed on each boundary point according to an order in which the boundary points are arranged, in the virtual boundary, along a boundary direction of the virtual boundary. When boundary attribute determination processing is performed on a first boundary point in the virtual boundary, it is determined whether the boundary point is any path point with a boundary attribute, and if the boundary point is any path point with a boundary attribute, a boundary attribute of the path point is used as the boundary attribute of the boundary point; otherwise, a boundary attribute of a path point closest to the boundary point is used as the boundary attribute of the boundary point. When boundary attribute determination processing is performed on each boundary point after the first boundary point in the virtual boundary, if the boundary point is any path point with a boundary attribute, it is determined whether a boundary attribute of the path point is the same as a boundary attribute of a previous boundary point of the boundary point, and if the boundary attribute of the path point is the same as the boundary attribute of the previous boundary point of the boundary point, it is determined that the boundary point does not have a boundary attribute, otherwise, the boundary attribute of the path point is used as the boundary attribute of the boundary point; if each of all path points is not the boundary point, it is determined whether a boundary attribute of a path point closest to the boundary point is the same as the boundary attribute of the previous boundary point of the boundary point, and if the boundary attribute of the path point closest to the boundary point is the same as the boundary attribute of the previous boundary point of the boundary point, it is determined that the boundary point does not have a boundary attribute, otherwise, the boundary attribute of the path point closest to the boundary point is used as the boundary attribute of the boundary point. Based on this, the boundary attributes of a part of the boundary points can be obtained.

In a possible implementation, in the process of controlling the automatic mowing apparatus to move, the automatic mowing apparatus may be controlled to move, according to a control instruction from an external control device.

After the automatic mowing apparatus is located at the movement starting point, the automatic mowing apparatus may be manually controlled to move, that is, the user may remotely control the automatic mowing apparatus through the external control device, so that the control device sends a control instruction to the automatic mowing apparatus, and the automatic mowing apparatus controls the automatic mowing apparatus to move according to the control instruction.

In the embodiment of the disclosure, a solution in which the control device remotely controls the automatic mowing apparatus to control the automatic mowing apparatus to move is adopted, so that the generated working map may meet individual demand of the user better.

In a process of controlling, according to the control instruction from the external control device, the automatic mowing apparatus to move: if a boundary attribute indicated by a most recently received boundary attribute configuration information is a first boundary attribute, when a lawn physical boundary is recognized and the automatic mowing apparatus does not straddle the lawn physical boundary, the automatic mowing apparatus may not be forced to straddle the lawn physical boundary, or the automatic mowing apparatus may be forced to straddle the lawn physical boundary, which is not limited in the embodiments of the disclosure.

Specific processing of not forcing the automatic mowing apparatus to straddle the lawn physical boundary may be as follows.

In a process of controlling, according to the control instruction from the external control device, the automatic mowing apparatus to move: if a boundary attribute indicated by a most recently received boundary attribute configuration information is a first boundary attribute, a prompt information is sent to the control device when the lawn physical boundary is recognized and the automatic mowing apparatus does not straddle the lawn physical boundary, to achieve that the automatic mowing apparatus is not forced to straddle the lawn physical boundary.

The prompt information is configured to prompt the user to control the automatic mowing apparatus to move by straddling the lawn physical boundary.

After receiving the above prompt information, the control device may display the prompt information in a display interface of the control device, until the automatic mowing apparatus moves by straddling the lawn physical boundary.

In the embodiment of the disclosure, when the boundary attribute indicated by the most recently received boundary attribute configuration information is the first boundary attribute, and in a process of the automatic mowing apparatus moving according to the control instruction from the external control device, if the automatic mowing apparatus does not straddle the lawn physical boundary, the automatic mowing apparatus is not forced to straddle the lawn physical boundary. There, the solution of sending the prompt information to the control device adopted in the disclosure may meet individual demand of the user better.

In the working map establishment stage, specific processing of forcing the automatic mowing apparatus to straddle the lawn physical boundary may be as follows.

In a process of controlling, according to the control instruction from the external control device, the automatic mowing apparatus to move: if a boundary attribute indicated by a most recently received boundary attribute configuration information is a first boundary attribute, when the lawn physical boundary is identified and the automatic mowing apparatus does not straddle the lawn physical boundary, the automatic mowing apparatus is controlled to straddle the recognized lawn physical boundary, to achieve that the automatic mowing apparatus is forced to straddle the lawn physical boundary.

The automatic mowing apparatus may include a vision sensor, and the above recognition of the lawn physical boundary and recognition of whether the automatic mowing apparatus straddles the lawn physical boundary may be performed by recognizing image information collected by the vision sensor, to determine whether the lawn physical boundary may be recognized and whether the automatic mowing apparatus straddles the lawn physical boundary.

In another possible implementation, in the process of controlling the automatic mowing apparatus to move, if the automatic mowing apparatus recognizing a lawn physical boundary meeting an autonomous movement condition, the automatic mowing apparatus is controlled to autonomously move along the lawn physical boundary.

When the automatic mowing apparatus is located at the movement starting point, the automatic mowing apparatus may be automatically moved, that is, when the automatic mowing apparatus recognizes the lawn physical boundary meeting the autonomous movement condition, the automatic mowing apparatus is controlled to autonomously move along the lawn physical boundary. The autonomous movement condition is that the automatic mowing apparatus recognizes a clear and simple lawn physical boundary, or the automatic mowing apparatus recognizes a preset lawn physical boundary, etc.

In the process of controlling the automatic mowing apparatus to move, if the automatic mowing apparatus recognizes the lawn physical boundary meeting the autonomous movement condition, an autonomous movement request may also be sent to the control device. After a confirmation instruction sent by the control device for the autonomous movement request is received, the automatic mowing apparatus is controlled to autonomously move along the lawn physical boundary.

In the embodiment of the disclosure, a solution in which the automatic mowing apparatus autonomously moves is adopted, so that manpower may be saved, and efficiency of generating the working map may be improved.

In the process of controlling the automatic mowing apparatus to move and collecting the path points, only a manner of manually controlling the automatic mowing apparatus to move may be adopted, or only a manner of autonomously moving the automatic mowing apparatus may be adopted, or a manner of combining manually controlling the automatic mowing apparatus to move with autonomously moving the automatic mowing apparatus may be adopted, which is not limited in the embodiments of the disclosure.

In a process of the user manually controlling the automatic mowing apparatus to move to collect the path points, the automatic mowing apparatus is usually controlled to move along the lawn physical boundary. At this time, if the user sees that a lawn physical boundary near the automatic mowing apparatus is clear, and a height difference between a lawn area surrounded by the lawn physical boundary near the automatic mowing apparatus and a non-lawn area outside the lawn physical boundary is small, the control device is enabled to send boundary attribute configuration information configured to indicate the first boundary attribute to the automatic mowing apparatus. For example, if the user sees that the lawn physical boundary near the automatic mowing apparatus is clear, and the height difference between the lawn area surrounded by the lawn physical boundary near the automatic mowing apparatus and the non-lawn area outside the lawn physical boundary is less than 1 cm, the control device is enabled to send the boundary attribute configuration information configured to indicate the first boundary attribute to the automatic mowing apparatus. If the user sees that the lawn physical boundary near the automatic mowing apparatus is clear, and the user determines that a risk of the automatic mowing apparatus falling, and/or becoming trapped or the like when the automatic mowing apparatus moves along the lawn physical boundary near the automatic mowing apparatus is small, the control device is enabled to send boundary attribute configuration information configured to indicate a second boundary attribute to the automatic mowing apparatus. If the user sees that the lawn physical boundary near the automatic mowing apparatus is clear, and the user determines that a risk of the automatic mowing apparatus falling, and/or becoming trapped or the like when the automatic mowing apparatus moves along the lawn physical boundary near the automatic mowing apparatus is small; if the user sees that the lawn physical boundary near the automatic mowing apparatus is not clear, or the user determines that a risk of the automatic mowing apparatus falling, and/or becoming trapped or the like when the automatic mowing apparatus moves along the lawn physical boundary near the automatic mowing apparatus is large, the control device is enabled to send boundary attribute configuration information configured to indicate a third boundary attribute to the automatic mowing apparatus.

In a possible implementation, the boundary attributes include at least two of a first boundary attribute, a second boundary attribute and a third boundary attribute. Based on this, after the working map is generated, that is, in the mowing operation stage, the following operation may be performed.

If the boundary attribute of the boundary point is the first boundary attribute, the automatic mowing apparatus is controlled to perform mowing operations in a first working mode, so that when the automatic mowing apparatus moves to the boundary point to perform mowing operations, if a boundary segment where the boundary point is located in the virtual boundary is a lawn physical boundary, the automatic mowing apparatus is controlled to straddle the boundary segment where the boundary point is located to perform mowing operations, and if the boundary segment where the boundary point is located in the virtual boundary is not the lawn physical boundary, the automatic mowing apparatus is controlled to move toward an area outside the preset area to perform mowing operations.

If the boundary attribute of the boundary point is the second boundary attribute, the automatic mowing apparatus is controlled to perform mowing operations in a second working mode, so that when the automatic mowing apparatus moves to the boundary point to perform mowing operations, if a boundary segment where the boundary point is located in the virtual boundary is a lawn physical boundary, the automatic mowing apparatus is controlled to perform mowing operations, in the preset area, along the boundary segment where the boundary point is located, and if the boundary segment where the boundary point is located in the virtual boundary is not the lawn physical boundary, the automatic mowing apparatus is controlled to move toward a lawn area outside the preset area to perform mowing operations.

If the boundary attribute of the boundary point is the third boundary attribute, the automatic mowing apparatus is controlled to perform mowing operations in a third working mode, so that when the automatic mowing apparatus moves to the boundary point to perform mowing operations, the automatic mowing apparatus moves along a virtual boundary where the boundary point is located in the preset area, to performs mowing operations.

In a possible implementation, when the automatic mowing apparatus is controlled to move toward the lawn area outside the preset area to perform mowing operations, if a distance between a lawn physical boundary outside the boundary segment where the boundary point is located and the boundary segment where the boundary point is located is less than or equal to a third distance, the automatic mowing apparatus is controlled to perform mowing operations along the lawn physical boundary outside the boundary segment where the boundary point is located; and if the distance between the lawn physical boundary outside the boundary segment where the boundary point is located and the boundary segment where the boundary point is located is greater than the third distance, the automatic mowing apparatus is controlled to perform mowing operations along an extension path whose distance from the boundary segment where the boundary point is located is equal to the third distance.

Based on this, in the implementation, in a process of controlling the automatic mowing apparatus to move toward the lawn area outside the preset area to perform mowing operations, if the lawn physical boundary is recognized within a first distance outside the preset area or at the first distance outside the preset area, the automatic mowing apparatus is controlled to straddle the lawn physical boundary to perform mowing operations along the lawn physical boundary; if the lawn physical boundary is not recognized within the first distance outside the preset area and at the first distance outside the preset area, the automatic mowing apparatus is controlled to move in the lawn area outside the preset area along a line outside the virtual boundary whose distance from the virtual boundary is equal to the first distance, to perform mowing operations. The third distance may be preset, for example, the third distance may be 0.5 m, or 1 m, etc.

In the embodiment of the disclosure, the generated working map includes at least two kinds of boundary points among a boundary point with the first boundary attribute, a boundary point with the second boundary attribute, and a boundary point with the third boundary attribute, so that adaptability of the automatic mowing apparatus in a process of performing mowing operations according to the working map may be improved. Specifically, the boundary point with the first boundary attribute may reduce a risk of the automatic mowing apparatus falling or becoming trapped during mowing, and meanwhile, since the automatic mowing apparatus mows by straddling a boundary segment where the boundary point with the first boundary attribute is located, grass near the lawn physical boundary may be cleaned cleaner. The boundary point with the second boundary attribute may enable the automatic mowing apparatus to extend mowing toward the lawn area outside the preset area as much as possible when the risk of the automatic mowing apparatus falling and becoming trapped is small, so that the automatic mowing apparatus may clean more grass to improve mowing efficiency. The boundary point with the third boundary attribute may reduce the risk of the automatic mowing apparatus falling and becoming trapped during mowing.

In a possible implementation, the boundary attributes include a straddle attribute, an extension attribute, or an extension-prohibited attribute. Based on this, in a process of controlling the automatic mowing apparatus to autonomously move along the lawn physical boundary, the following processing may be performed.

If a boundary attribute indicated by a most recently received boundary attribute configuration information is the first boundary attribute, the automatic mowing apparatus is controlled to straddle the lawn physical boundary and autonomously move along the lawn physical boundary; and if the boundary attribute indicated by the most recently received boundary attribute configuration information is the second boundary attribute or the third boundary attribute, the automatic mowing apparatus is controlled to autonomously move along the lawn physical boundary in a lawn area surrounded by the lawn physical boundary.

In an example, specific processing of controlling the automatic mowing apparatus to straddle the lawn physical boundary and autonomously move along the lawn physical boundary may be that in the process of controlling the automatic mowing apparatus to autonomously move along the lawn physical boundary, a central axis of the automatic mowing apparatus parallel to a head-to-tail direction of the automatic mowing apparatus is located above the lawn physical boundary and is flush with the lawn physical boundary, to achieve that the automatic mowing apparatus straddles the lawn physical boundary and moves along the lawn physical boundary.

In another example, specific processing of controlling the automatic mowing apparatus to straddle the lawn physical boundary and autonomously move along the lawn physical boundary may also be that two lines, outside both sides of the lawn physical boundary, whose distance from the lawn physical boundary is half of a width of the automatic mowing apparatus, are determined as a first boundary and a second boundary respectively. In the process of controlling the automatic mowing apparatus to autonomously move along the lawn physical boundary, the automatic mowing apparatus moves between the first boundary and the second boundary, to achieve that the automatic mowing apparatus straddles the lawn physical boundary and moves along the lawn physical boundary. When the automatic mowing apparatus is placed on a horizontal plane to perform mowing operations, a height direction of the automatic mowing apparatus is parallel to a vertical direction, a length direction of the automatic mowing apparatus is parallel to the head-to-tail direction of the automatic mowing apparatus, a width direction of the automatic mowing apparatus is perpendicular to the height direction of the automatic mowing apparatus, and the width direction of the automatic mowing apparatus is perpendicular to the length direction of the automatic mowing apparatus. Based on this, width of the automatic mowing apparatus is a maximum dimension of the automatic mowing apparatus in the width direction of the automatic mowing apparatus.

Specific processing of controlling the automatic mowing apparatus to autonomously move along the lawn physical boundary in the lawn area surrounded by the lawn physical boundary may be that in the process of controlling the automatic mowing apparatus to autonomously move along the lawn physical boundary, the automatic mowing apparatus is controlled to be located in the lawn area, and the automatic mowing apparatus is controlled to stay as close as possible to an edge of the lawn area near the lawn physical boundary on a working plane of the automatic mowing apparatus.

In the embodiment of the disclosure, in a process of the automatic mowing apparatus autonomously moving along the recognized lawn physical boundary meeting the autonomous movement condition to collect the path points, a relative position between the automatic mowing apparatus and the lawn physical boundary is adjusted by the boundary attribute indicated by the most recently received boundary attribute configuration information, so that manners of collecting the path points by the automatic mowing apparatus may be more flexible, and individual demand of the user may be met better; furthermore, when the automatic mowing apparatus subsequently moves to each boundary point in the virtual boundary obtained according to the collected path points to mow, the adopted working mode is matched with the boundary attribute of the boundary point better, to achieve a purpose of cleaning grass near the virtual boundary cleaner.

In a possible implementation, the boundary attribute of the boundary point is configured to indicate a relative position relationship between a mowing path of the automatic mowing apparatus and the virtual boundary, when the automatic mowing apparatus moves to a boundary segment where the boundary point is located in the virtual boundary to perform mowing operations; or the boundary attribute of the boundary point is configured to indicate a relative position relationship between the mowing path of the automatic mowing apparatus and a lawn physical boundary, when the automatic mowing apparatus moves to the boundary segment where the boundary point is located in the virtual boundary to perform mowing operations.

In a possible implementation, the virtual boundary includes a first boundary point and a second boundary point adjacent to each other, the first boundary point and the second boundary point correspond to different boundary attributes, and when the automatic mowing apparatus performs mowing operations along the virtual boundary, and the automatic mowing apparatus moves from a first boundary segment where the first boundary point is located to a second boundary segment where the second boundary point is located, a distance between a mowing path of the automatic mowing apparatus and a lawn physical boundary changes from a first distance to a second distance.

The distance between the mowing path of the automatic mowing apparatus and the lawn physical boundary is a distance between the midpoint of the line connecting center points of two rollers of the automatic mowing apparatus and the lawn physical boundary on the working plane of the automatic mowing apparatus.

If the boundary attribute of the boundary point is the first boundary attribute, the automatic mowing apparatus is controlled to perform mowing operations in a first working mode, so that when the automatic mowing apparatus moves to the boundary point to perform mowing operations, if a boundary segment where the boundary point is located in the virtual boundary is a lawn physical boundary, the automatic mowing apparatus is controlled to straddle the boundary segment where the boundary point is located to perform mowing operations, the distance between the mowing path of the automatic mowing apparatus and the lawn physical boundary is a first target distance at this time. if the boundary segment where the boundary point is located in the virtual boundary is not the lawn physical boundary, the automatic mowing apparatus is controlled to move toward a lawn area outside the preset area to perform mowing operations, the distance between the mowing path of the automatic mowing apparatus and the lawn physical boundary is a second target distance at this time.

The first target distance is equal to or greater than 0 meter, and the first target distance is less than a first preset distance. For example, the first target distance is equal to or greater than 0 meter, and the first target distance is less than 0.1 meters. If the boundary segment where the boundary point is located in the virtual boundary is not the lawn physical boundary: when a distance between the boundary segment and the lawn physical boundary is less than or equal to a second preset distance, the second target distance is equal to the first target distance; and when the distance between the boundary segment and the lawn physical boundary is greater than the second preset distance, the second target distance is a distance between a position at the second preset distance outside the lawn physical boundary and the lawn physical boundary. The second preset distance is greater than 0 meter, for example, the second target distance is 1 meter.

If the boundary attribute of the boundary point is the second boundary attribute, the automatic mowing apparatus is controlled to perform mowing operations in a second working mode, so that when the automatic mowing apparatus moves to the boundary point to perform mowing operations, if a boundary segment where the boundary point is located in the virtual boundary is a lawn physical boundary, the automatic mowing apparatus is controlled to perform mowing operations, in the preset area, along the boundary segment where the boundary point is located, the distance between the mowing path of the automatic mowing apparatus and the lawn physical boundary is a third target distance at this time and if the boundary segment where the boundary point is located in the virtual boundary is not the lawn physical boundary, the automatic mowing apparatus is controlled to move toward a lawn area outside the preset area to perform mowing operations, the distance between the mowing path of the automatic mowing apparatus and the lawn physical boundary is the second target distance at this time.

If the boundary attribute of the boundary point being the third boundary attribute, the automatic mowing apparatus is controlled to perform mowing operations in a third working mode, so that when the automatic mowing apparatus moves to the boundary point to perform mowing operations, the automatic mowing apparatus moves along a virtual boundary where the boundary point is located in the preset area, to performs mowing operations, the distance between the mowing path of the automatic mowing apparatus and the lawn physical boundary is the third target distance at this time.

In a possible implementation, when the automatic mowing apparatus is controlled to move toward the lawn area outside the preset area to perform mowing operations, if a distance between a lawn physical boundary outside the boundary segment where the boundary point is located and the boundary segment where the boundary point is located is less than or equal to a third distance, the automatic mowing apparatus is controlled to perform mowing operations along the lawn physical boundary outside the boundary segment where the boundary point is located; and if the distance between the lawn physical boundary outside the boundary segment where the boundary point is located and the boundary segment where the boundary point is located is greater than the third distance, the automatic mowing apparatus is controlled to perform mowing operations along an extension path whose distance from the boundary segment where the boundary point is located is equal to the third distance.

Based on this, in the implementation, in a process of controlling the automatic mowing apparatus to move toward the lawn area outside the preset area to perform mowing operations, if the lawn physical boundary is recognized within a first distance outside the preset area or at the first distance outside the preset area, the automatic mowing apparatus is controlled to straddle the lawn physical boundary to perform mowing operations along the lawn physical boundary; if the lawn physical boundary is not recognized within the first distance outside the preset area and at the first distance outside the preset area, the automatic mowing apparatus is controlled to move in the lawn area outside the preset area along a line outside the virtual boundary whose distance from the virtual boundary is equal to the first distance, to perform mowing operations. The third distance may be preset, for example, the third distance may be 0.5 m, or 1 m, etc.

Based on this, the first distance is the first target distance, the second target distance or the third target distance, and the second distance is the first target distance, the second target distance or the third target distance.

In a possible implementation, a transition path segment is provided between the first boundary segment and the second boundary segment, an end of the transition path segment is connected to a terminal end of the first boundary segment, and another end of the transition path segment is connected to a head end of the second boundary segment.

In a process of controlling the automatic mowing apparatus to autonomously move along the identified lawn physical boundary meeting the autonomous movement condition, if the boundary attribute indicated by the most recently received boundary attribute configuration information is the first boundary attribute, and it will be achieved that the automatic mowing apparatus straddles the lawn physical boundary and moves along the lawn physical boundary, whether the automatic mowing apparatus may straddle the lawn physical boundary may be recognized by the automatic mowing apparatus. If the lawn physical boundary is a high wall, or a fence, or the like, it means that the automatic mowing apparatus cannot straddle the lawn physical boundary, and the automatic mowing apparatus automatically exits an autonomous movement state at this time; if the lawn physical boundary is recognized as being capable of straddling it, the automatic mowing apparatus straddles the lawn physical boundary and moves along the lawn physical boundary. Based on this, if the lawn physical boundary is recognized as being capable of straddling, while the lawn physical boundary cannot be straddled actually, the automatic mowing apparatus may be controlled to forcibly move toward the lawn physical boundary, causing the automatic mowing apparatus to become trapped, and finally triggering a protection mechanism of the automatic mowing apparatus, to automatically exit the autonomous movement state.

Furthermore, after the virtual boundary is determined, the virtual boundary may also be adjusted, and a specific processing manner is as follows.

A first control signal is received, and the automatic mowing apparatus is controlled to walk from a first starting point to a second starting point along the virtual boundary according to the first control signal, the first starting point and the second starting point are points on the virtual boundary. A starting point confirmation instruction is received, and the second starting point is used as a starting point for modifying the virtual boundary according to the starting point confirmation instruction. A second control signal is received, the automatic mowing apparatus is controlled to walk from the second starting point to an end point according to the second control signal, and an updated virtual boundary is determined according to a walking trajectory between the second starting point and the end point. In a process of controlling the automatic mowing apparatus to move from the second starting point to the end point according to the second control signal, path points on the walking trajectory between the second starting point and the end point and boundary attributes of at least a part of the path points are re-collected, so that boundary points on a part from the second starting point to the end point in the determined updated virtual boundary and boundary attributes of the boundary points are also updated. A process of collecting path points on the part between the second starting point and the end point in the updated virtual boundary is similar to the above process of collecting path points in the original virtual boundary, and a process of obtaining the part between the second starting point and the end point in the updated virtual boundary is similar to the above process of obtaining the original virtual boundary, which are not elaborated in the embodiment of the disclosure.

The working process of the automatic mowing apparatus usually includes two stages, that is, a working map establishment stage and a mowing operation stage. In the working map establishment stage, the automatic mowing apparatus usually works by using the above method for generating a working map, and in the mowing operation stage, the automatic mowing apparatus usually works by using a mowing operation method.

An embodiment of the disclosure provides an operation method, and the operation method will be described in detail below with reference to multiple embodiments.

Figure 2:
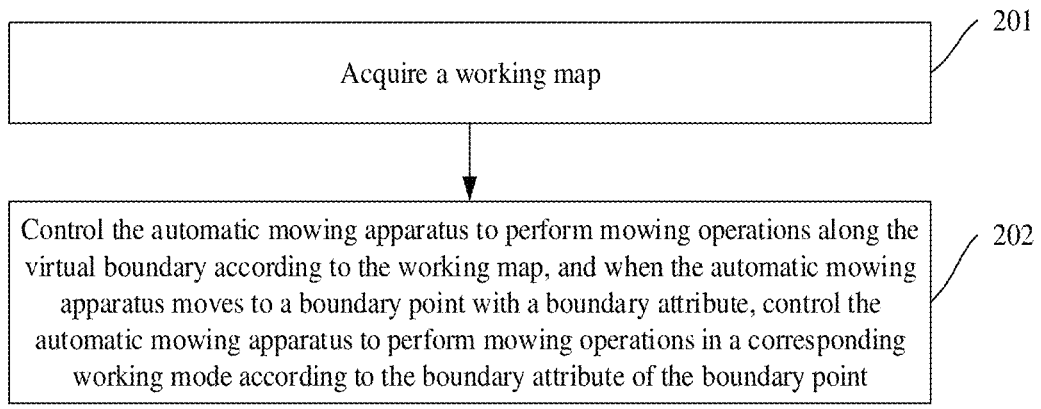
FIG. 2 is a flowchart of an operation method according to an embodiment of the disclosure.

FIG. 2 is a flowchart of an operation method according to an embodiment of the disclosure. As shown in FIG. 2, the operation method includes the following operations 201 and 202.

In operation 201, a working map is acquired.

The working map may be the working map in the above operation 103, or may be a working map meeting the following conditions: the working map includes position information of multiple boundary points and boundary attributes of at least a part of the boundary points, and multiple boundary points are configured to indicate a virtual boundary surrounding a preset area.

In operation 202, the automatic mowing apparatus is controlled to perform mowing operations along the virtual boundary according to the working map, and when the automatic mowing apparatus moves to a boundary point with a boundary attribute, the automatic mowing apparatus is controlled to perform mowing operations in a corresponding working mode according to the boundary attribute of the boundary point.

Working modes when the automatic mowing apparatus moves to boundary points corresponding to different boundary attributes are different.

In the embodiment of the disclosure, after a working map including position information of multiple boundary points and boundary attributes of at least a part of the boundary points is acquired, the automatic mowing apparatus is controlled to perform mowing operations along the virtual boundary according to the working map. In this way, since working modes when the automatic mowing apparatus moves to boundary points with different boundary attributes in the virtual boundary to perform mowing operations are different, setting of the boundary attributes may enable different working modes to be adopted when the automatic mowing apparatus moves to at least a part of different positions of the virtual boundary to perform mowing operations, so that the automatic mowing apparatus may clean grass near the virtual boundary cleaner, to reduce a possibility of requiring reworked mowing. Therefore, work efficiency of the automatic mowing apparatus may be improved, and individual demand of the user for mowing effect of the automatic mowing apparatus may also be met.

In a possible implementation, the boundary attribute of the boundary point is configured to indicate a relative position relationship between a mowing path of the automatic mowing apparatus and the virtual boundary, when the automatic mowing apparatus moves to a boundary segment where the boundary point is located in the virtual boundary to perform mowing operations; or the boundary attribute of the boundary point is configured to indicate a relative position relationship between the mowing path of the automatic mowing apparatus and a lawn physical boundary, when the automatic mowing apparatus moves to the boundary segment where the boundary point is located in the virtual boundary to perform mowing operations.

In a possible implementation, the above operation of acquiring the working map may include the following specific processing. An initial map is acquired, boundary attributes are configured for at least a part of boundary points in the initial map, and the working map including the position information of multiple boundary points and the boundary attributes of at least the part of the boundary points is generated. The initial map includes the position information of multiple boundary points, and multiple boundary points are configured to indicate the virtual boundary surrounding the preset area.

After position information of multiple path points and boundary attributes of at least a part of the path points are acquired, the position information of multiple path points are pre-processed such as filtered, fitted and/or deleted, etc., to obtain the position information of multiple boundary points, to generate an initial map including the position information of multiple boundary points; then, boundary attributes of at least a part of the boundary points are determined in the initial map according to attribute information of at least the part of the path points; and then, the working map is generated according to the position information of multiple boundary points and the boundary attributes of at least the part of the boundary points. A specific processing manner for determining the boundary attributes of at least the part of the boundary points according to the attribute information of at least the part of the path points has been described in detail in the embodiment of the method for generating a working map, which is not elaborated in the embodiment of the disclosure.

In a possible implementation, the initial map includes a map generated from a movement path when the automatic mowing apparatus is remotely controlled to move, a map generated from a movement path when the automatic mowing apparatus moves autonomously, a map drawn by a user, or a map created in advance.

The above initial map includes the position information of multiple boundary points, and the position information of multiple boundary points are obtained according to the position information of multiple path points. Based on this, the position information of multiple path points may be obtained according to the movement path when the automatic mowing apparatus is remotely controlled to move, or may be obtained according to the movement path when the automatic mowing apparatus moves autonomously, or may be drawn by the user, or may be created in advance, which is not limited in the embodiments of the disclosure.

In a possible implementation, in a process of controlling the automatic mowing apparatus to perform mowing operations in the corresponding working mode according to the boundary attribute of the boundary point, if the boundary attribute of the boundary point is a first boundary attribute, the automatic mowing apparatus is controlled to perform mowing operations in a first working mode. When the automatic mowing apparatus performs mowing operations in the first working mode, if a boundary segment where the boundary point is located in the virtual boundary is a lawn physical boundary, the automatic mowing apparatus is controlled to straddle the boundary segment where the boundary point is located to perform mowing operations, and if the boundary segment where the boundary point is located in the virtual boundary is not the lawn physical boundary, the automatic mowing apparatus is controlled to move toward a lawn area outside the preset area to perform mowing operations.

In a possible implementation, in a process of controlling the automatic mowing apparatus to perform mowing operations in the corresponding working mode according to the boundary attribute of the boundary point, if the boundary attribute of the boundary point is a second boundary attribute, the automatic mowing apparatus is controlled to perform mowing operations in a second working mode. When the automatic mowing apparatus performs mowing operations in the second working mode, if a boundary segment where the boundary point is located in the virtual boundary is a lawn physical boundary, the automatic mowing apparatus is controlled to perform mowing operations along the boundary segment where the boundary point is located in the preset area, and if the boundary segment where the boundary point is located in the virtual boundary is not the lawn physical boundary, the automatic mowing apparatus is controlled to move toward a lawn area outside the preset area to perform mowing operations.

In a possible implementation, when the automatic mowing apparatus is controlled to move toward the lawn area outside the preset area to perform mowing operations, if a distance between a lawn physical boundary outside the boundary segment where the boundary point is located and the boundary segment where the boundary point is located is less than or equal to a third distance, the automatic mowing apparatus is controlled to perform mowing operations along the lawn physical boundary outside the boundary segment where the boundary point is located; and if the distance between the lawn physical boundary outside the boundary segment where the boundary point is located and the boundary segment where the boundary point is located is greater than the third distance, the automatic mowing apparatus is controlled to perform mowing operations along an extension path whose distance from the boundary segment where the boundary point is located is equal to the third distance.

Based on this, in the implementation, in a process of controlling the automatic mowing apparatus to move toward the lawn area outside the preset area to perform mowing operations, if the lawn physical boundary is recognized within a first distance outside the preset area or at the first distance outside the preset area, the automatic mowing apparatus is controlled to straddle the lawn physical boundary to perform mowing operations along the lawn physical boundary; if the lawn physical boundary is not recognized within the first distance outside the preset area and at the first distance outside the preset area, the automatic mowing apparatus is controlled to move in the lawn area outside the preset area and perform mowing operations along a line outside the virtual boundary whose distance from the virtual boundary is equal to the first distance. The third distance may be preset, for example, the third distance may be 0.5 m, or 1 m, etc.

In a possible implementation, in a process of controlling the automatic mowing apparatus to perform mowing operations in the corresponding working mode according to the boundary attribute of the boundary point, if the boundary attribute of the boundary point is a third boundary attribute, the automatic mowing apparatus is controlled to perform mowing operations in a third working mode, so that the automatic mowing apparatus performs mowing operations, in the preset area, along the boundary segment where the boundary point is located.

In the embodiment of the disclosure, setting of the boundary attributes may enable different working modes to be adopted when the automatic mowing apparatus moves to at least a part of different positions of the virtual boundary to perform mowing operations, so that the automatic mowing apparatus may clean grass near the virtual boundary cleaner, to reduce a possibility of requiring reworked mowing. Therefore, work efficiency of the automatic mowing apparatus may be improved, and individual demand of the user for mowing effect of the automatic mowing apparatus may also be met.

In a possible implementation, the mowing operation method further includes the following operations. When the automatic mowing apparatus moves from a first boundary segment where a first boundary point is located to a second boundary segment where a second boundary point is located, a distance between a mowing path of the automatic mowing apparatus and a lawn physical boundary is controlled to be changed from a first distance to a second distance, here the first boundary point and the second boundary point are adjacent boundary points in the virtual boundary, and the first boundary point and the second boundary point correspond to different boundary attributes.

In a possible implementation, when the automatic mowing apparatus moves from the first boundary segment to the second boundary segment, the automatic mowing apparatus moves from a terminal end of the first boundary segment to an end of a transition path segment, and moves from another end of the transition path segment to a head end of the second boundary segment.

Furthermore, in a process of controlling the automatic mowing apparatus to perform mowing operations along the virtual boundary according to the working map, whether an obstacle is present within the virtual boundary and within a position whose distance from the virtual boundary is less than a third preset distance may be recognized by the automatic mowing apparatus, and if the obstacle is present, the automatic mowing apparatus moves in a direction within the virtual boundary to avoid the obstacle, and reduce a possibility of damage or abnormal operation of the automatic mowing apparatus due to impacting the obstacle. The third preset distance may be 0.3 m, or 0.5 m, etc.

An embodiment of the disclosure provides a method for controlling an automatic operation apparatus, and the method for controlling an automatic operation apparatus will be described in detail below with reference to multiple embodiments. The method for controlling an automatic operation apparatus in the following embodiments may be applied to an external control device such as an automatic mowing apparatus, a sweeping robot, etc. The method for controlling an automatic operation apparatus will be described below by taking the automatic operation apparatus being the automatic mowing apparatus as an example. It should be noted that in order to be able to describe specific implementations of the method for controlling an automatic operation apparatus in combination with application scenarios, the following embodiments illustrate the method for controlling an automatic operation apparatus in an adaptive and scenario-oriented manner, such as a scenario-adaptive description in which a mowing control is an operation control, a scenario-adaptive description in which a lawn physical boundary is an physical boundary, a scenario-adaptive description in which a mowing path is an operation path, a scenario-adaptive description in which a mowing instruction is an operation instruction, etc.

The method for controlling an automatic operation apparatus may be applied to an external control device, and in particular to software in the control device such as an application program, or an applet, or the like, and the control device may be an intelligent device such as a mobile phone, or a computer, or the like, which is not limited in the embodiments of the disclosure.

Figure 3:
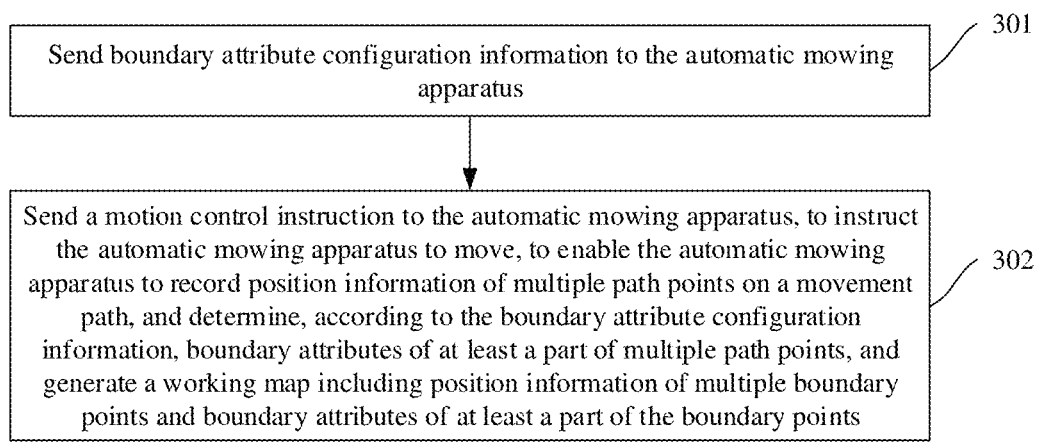
FIG. 3 is a flowchart of a method for controlling an automatic operation apparatus according to an embodiment of the disclosure.

FIG. 3 is a flowchart of a method for controlling an automatic operation apparatus according to an embodiment of the disclosure. As shown in FIG. 3, the method for controlling an automatic mowing apparatus includes the following operations 301 and 302.

In operation 301, boundary attribute configuration information is sent to the automatic mowing apparatus.

In operation 302, a motion control instruction is sent to the automatic mowing apparatus, to instruct the automatic mowing apparatus to move, to enable the automatic mowing apparatus to record position information of multiple path points on a movement path, and determine, according to the boundary attribute configuration information, boundary attributes of at least a part of multiple path points, and generate a working map including position information of multiple boundary points and boundary attributes of at least a part of the boundary points.

The position information of multiple boundary points are determined according to the position information of multiple path points. The boundary attribute of the boundary point is determined according to the boundary attribute of the path point. Multiple boundary points are configured to indicate including a virtual boundary surrounding a preset area. When the automatic mowing apparatus performs mowing operations along the virtual boundary according to the working map, working modes when the automatic mowing apparatus moves to boundary points corresponding to different boundary attributes are different.

In the embodiment of the disclosure, the control device sends boundary attribute configuration information to the automatic mowing apparatus and sends a motion control instruction to the automatic mowing apparatus, to instruct the automatic mowing apparatus to move, to enable the automatic mowing apparatus to record position information of multiple path points on a movement path, and generate a working map including position information of multiple boundary points and boundary attributes of at least a part of the boundary points. When the automatic mowing apparatus performs mowing operations along the virtual boundary according to the working map, working modes when the automatic mowing apparatus moves to boundary points corresponding to different boundary attributes are different. In this way, since working modes when the automatic mowing apparatus moves to boundary points corresponding to different boundary attributes are different, setting of the boundary attributes may enable different working modes to be adopted when the automatic mowing apparatus moves to at least a part of different positions of the virtual boundary to perform mowing operations, so that the automatic mowing apparatus may clean grass near the virtual boundary cleaner, to reduce a possibility of requiring reworked mowing. Therefore, work efficiency of the automatic mowing apparatus may be improved, and individual demand of the user for mowing effect of the automatic mowing apparatus may also be met.

In a possible implementation, when the boundary attribute configuration information is sent to the automatic mowing apparatus, the boundary attribute configuration information is sent to the automatic mowing apparatus in response to a mapping control or an attribute control of the control device being triggered.

The mapping control and the attribute control may be buttons installed on the control device, or may be touchable controls displayed on a display interface of the control device, which is not limited in the embodiments of the disclosure.

In a possible implementation, the above operation of sending the boundary attribute configuration information to the automatic mowing apparatus in response to the attribute control being triggered includes the following operations. The boundary attribute configuration information is sent to the automatic mowing apparatus, in response to each time the attribute control being triggered. The boundary attribute configuration information sent to the automatic mowing apparatus in two adjacent times indicate the same or different boundary attributes.

In a possible implementation, when the automatic mowing apparatus determines the boundary attribute of the path point, the boundary attribute of the path point is determined according to most recently received boundary attribute configuration information. Multiple attribute controls are provided, different attribute configuration information are sent to the automatic mowing apparatus when different attribute controls are triggered, and boundary attributes indicated by different boundary attribute configuration information are different. Or, one attribute control is provided, and when the one attribute control is triggered, one piece of attribute configuration information is circularly selected from multiple pieces of different attribute configuration information in a preset order and sent to the automatic mowing apparatus, and boundary attributes indicated by different boundary attribute configuration information are different.

Figure 4:
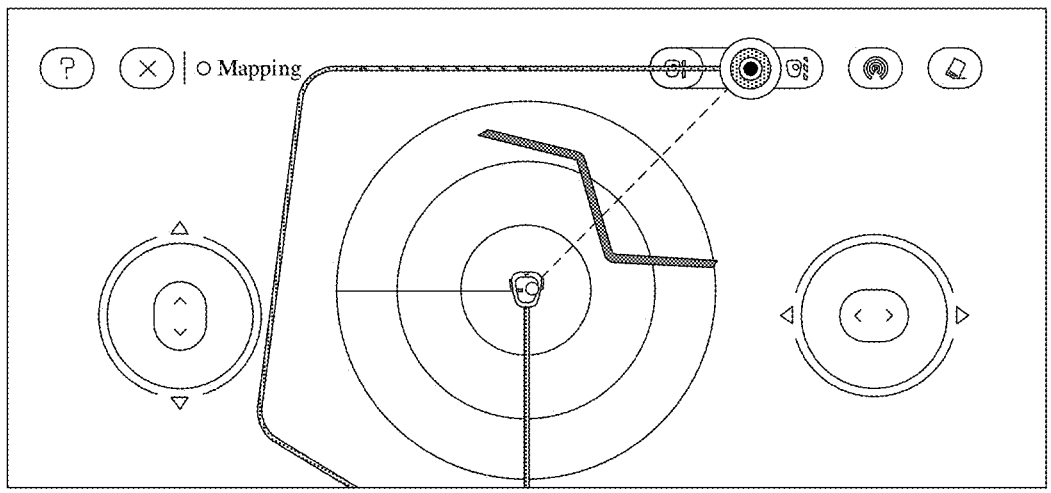
FIG. 4 is a diagram of a display interface for selecting an attribute control according to an embodiment of the disclosure.

If multiple attribute controls are provided, one boundary attribute control of the control device is in a triggered state at the same time. Based on this, a specific operation process of triggering the attribute control may be as follows. After the mapping control of the control device is triggered, only one attribute control is displayed on the display interface of the control device. If the attribute control is displayed, all boundary attribute controls on the display interface of the control device are expanded and displayed, then another attribute control may be selected to be triggered, only the another attribute control is continuously displayed on the display interface of the control device after triggering, and other attribute controls other than the another attribute control are hidden. FIG. 4 is a diagram of a display interface for selecting an attribute control according to an embodiment of the disclosure, and a display interface when all attribute controls on the display interface of the control device are expanded and displayed is shown in FIG. 4.

In a possible implementation, the above operation of sending the motion control instruction to the automatic mowing apparatus includes the following specific processing. A first motion control instruction is sent to the automatic mowing apparatus in response to a first motion control of the control device being triggered, here the first motion control instruction includes at least one of a motion direction parameter, a motion speed parameter, or a motion acceleration parameter. And/or, an autonomous movement request from the automatic mowing apparatus is received, a second motion control instruction is sent to the automatic mowing apparatus in response to a second motion control of the control device being triggered, here the autonomous movement request is sent by the automatic mowing apparatus to the control device when a lawn physical boundary meeting an autonomous movement condition is recognized, and the second motion control instruction is configured to instruct the automatic mowing apparatus to autonomously move along the recognized lawn physical boundary meeting the autonomous movement condition.

The above second motion control may also be in a non-triggerable state by default, and after the autonomous movement request from the automatic mowing apparatus is received, the second motion control may be in a trigger-confirmable state, and then the user may manually trigger the second motion control, to send the second motion control instruction to the automatic mowing apparatus.

When the second motion control is triggered, one of multiple attribute controls is triggered by default. The second motion control is an outer boundary second motion control or an inner boundary second motion control. If the outer boundary second motion control is triggered, it means that the automatic mowing apparatus is controlled to move along an outer boundary of the to-be-mowed area from the movement starting point, and the triggered attribute control is an attribute control configured to indicate a second boundary attribute, by default at this time. If the inner boundary second motion control is triggered, it means that the automatic mowing apparatus is controlled to move along an inner boundary of the to-be-mowed area from the movement starting point, and the triggered attribute control is an attribute control configured to indicate a third boundary attribute by default at this time.

Figure 5:
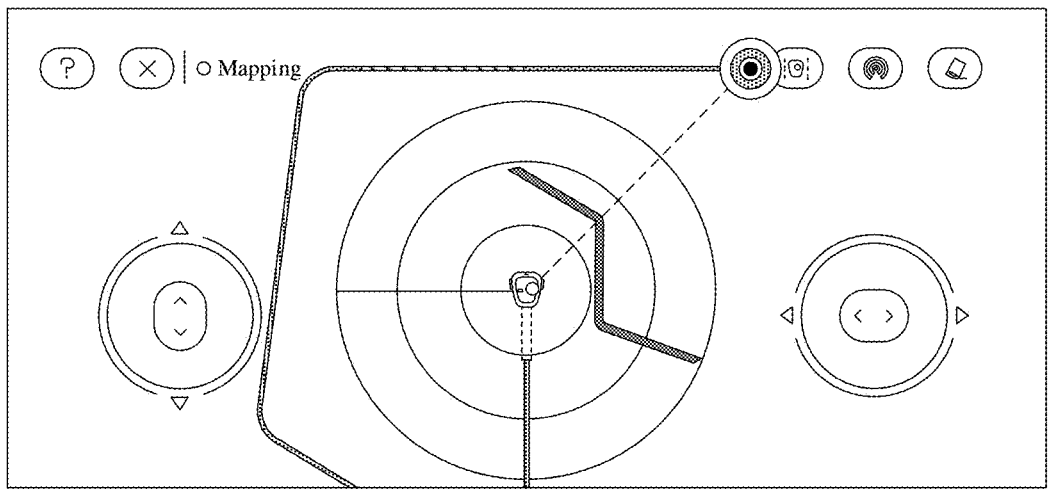
FIG. 5 is a diagram of a display interface of a control device when a map is created based on a first boundary attribute according to an embodiment of the disclosure.
Figure 6:
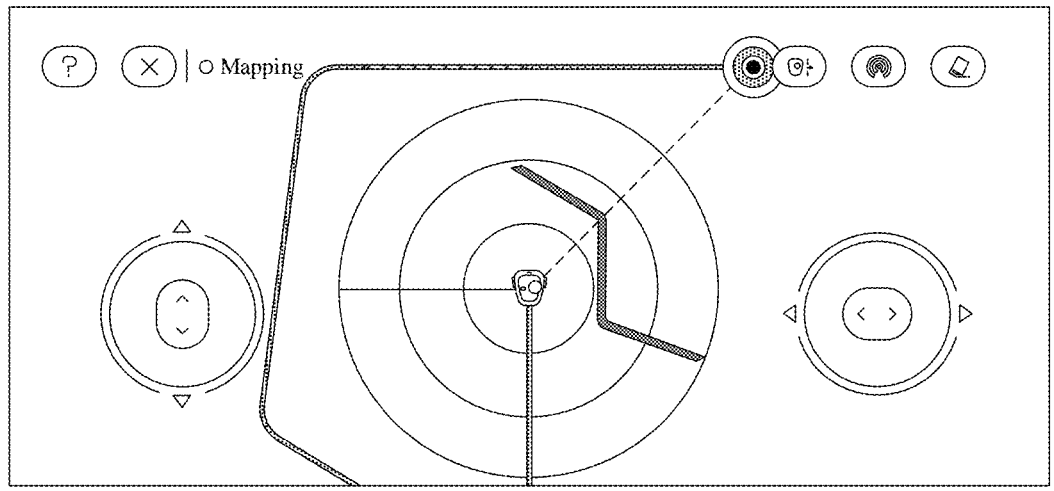
FIG. 6 is a diagram of a display interface of a control device when a map is created based on a second boundary attribute according to an embodiment of the disclosure.
Figure 7:
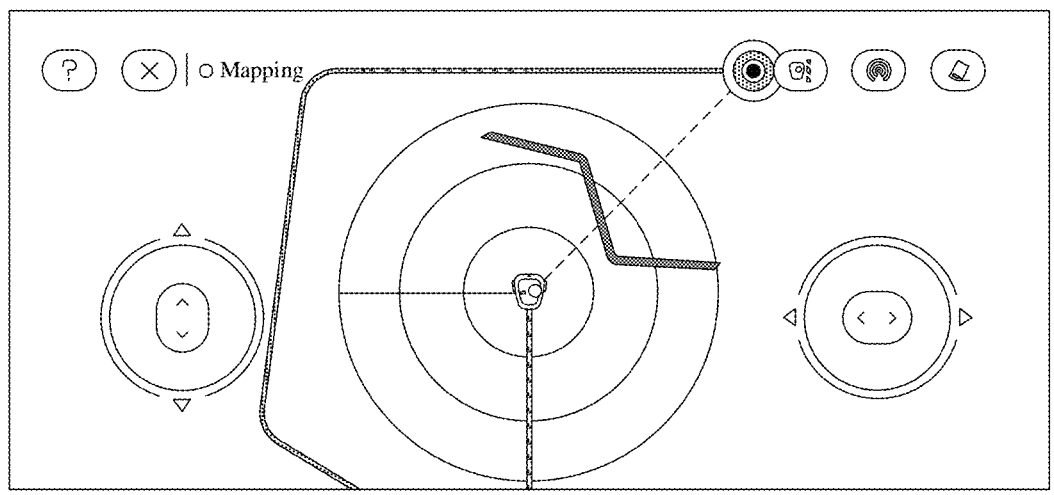
FIG. 7 is a diagram of a display interface of a control device when a map is created based on a third boundary attribute according to an embodiment of the disclosure.

For example, FIG. 5 is a diagram of a display interface of a control device when a map is created based on a first boundary attribute according to an embodiment of the disclosure. After the second motion control is triggered, if a most recently triggered attribute control of the control device is an attribute control configured to indicate the first boundary attribute, the display interface of the control device is shown in FIG. 5. FIG. 6 is a diagram of a display interface of a control device when a map is created based on a second boundary attribute according to an embodiment of the disclosure. After the second motion control is triggered, if a most recently triggered attribute control in the control device is an attribute control configured to indicate the second boundary attribute, the display interface of the control device is shown in FIG. 6. FIG. 7 is a diagram of a display interface of a control device when a map is created based on a third boundary attribute according to an embodiment of the disclosure. After a mapping controlling control in the control device is triggered, if a most recently triggered attribute control in the control device is an attribute control configured to indicate the third boundary attribute, the display interface of the control device is shown in FIG. 7.

The second motion control may be the same control as the mapping control, or may be a control different from the mapping control, which is not limited in the embodiments of the disclosure.

In a possible implementation, the method for controlling an automatic mowing apparatus further includes the following operations. Position information of a path point sent by the automatic mowing apparatus is received. A previous path point of a current path point is determined according to an order in which the automatic mowing apparatus moves to different path points, here the current path point is not a first path point from which the automatic mowing apparatus moves. A connection line between the current path point and the previous path point is displayed in a display interface of the control device by a line pattern corresponding to a boundary attribute of the current path point. Here, line patterns corresponding to different boundary attributes are different.

In a possible implementation, the method for controlling an automatic mowing apparatus further includes the following operations. With respect to the first path point, position information of the path point sent by the automatic mowing apparatus is received, and the path point is displayed in a preset point pattern in the display interface of the control device.

In a possible implementation, the method for controlling an automatic mowing apparatus further includes the following operations. Boundary attribute configuration information of the path points sent by the automatic mowing apparatus is received, and a boundary attribute of the current path point is determined according to boundary attribute configuration information of the current path point. Or, boundary attribute configuration information most recently sent to the automatic mowing apparatus before the automatic mowing apparatus records position information of the current path point is determined, and a boundary attribute indicated by the boundary attribute configuration information is determined as the boundary attribute of the current path point.

In a possible implementation, the method for controlling an automatic mowing apparatus further includes the following operations. A mowing instruction is sent to the automatic mowing apparatus in response to a mowing control in the control device is triggered. Here the mowing instruction is configured to instruct the automatic mowing apparatus to perform mowing operations according to the working map, and send positioning information to the control device, the positioning information is configured to indicate a position where the automatic mowing apparatus is located during the mowing operations. The positioning information from the automatic mowing apparatus is received. The position of the automatic mowing apparatus is displayed in a display interface of the control device according to the positioning information.

The positioning information may be two-dimensional rectangular coordinate information with a starting point of the mowing operations as an origin, or longitude and latitude coordinate information, etc.

In a possible implementation, the boundary attributes include at least two of a first boundary attribute, a second boundary attribute and a third boundary attribute. Based on this, the following operations may be performed.

If the boundary attribute of the boundary point is the first boundary attribute, the automatic mowing apparatus is controlled to perform mowing operations in a first working mode, so that when the automatic mowing apparatus moves to the boundary point to perform mowing operations, if a boundary segment where the boundary point is located in the virtual boundary is a lawn physical boundary, the automatic mowing apparatus is controlled to straddle the boundary segment where the boundary point is located to perform mowing operations, and if the boundary segment where the boundary point is located in the virtual boundary is not the lawn physical boundary, the automatic mowing apparatus is controlled to move toward a lawn area outside the preset area to perform mowing operations.

If the boundary attribute of the boundary point is the second boundary attribute, the automatic mowing apparatus is controlled to perform mowing operations in a second working mode, so that when the automatic mowing apparatus moves to the boundary point to perform mowing operations, if a boundary segment where the boundary point is located in the virtual boundary is a lawn physical boundary, the automatic mowing apparatus is controlled to perform mowing operations along the boundary segment where the boundary point is located in the preset area, and if the boundary segment where the boundary point is located in the virtual boundary is not the lawn physical boundary, the automatic mowing apparatus is controlled to move toward a lawn area outside the preset area to perform mowing operations.

If the boundary attribute of the boundary point is the third boundary attribute, the automatic mowing apparatus is controlled to perform mowing operations in a third working mode, so that when the automatic mowing apparatus moves to the boundary point to perform mowing operations, the automatic mowing apparatus moves along a virtual boundary where the boundary point is located in the preset area, to performs mowing operations.

Figure 8:
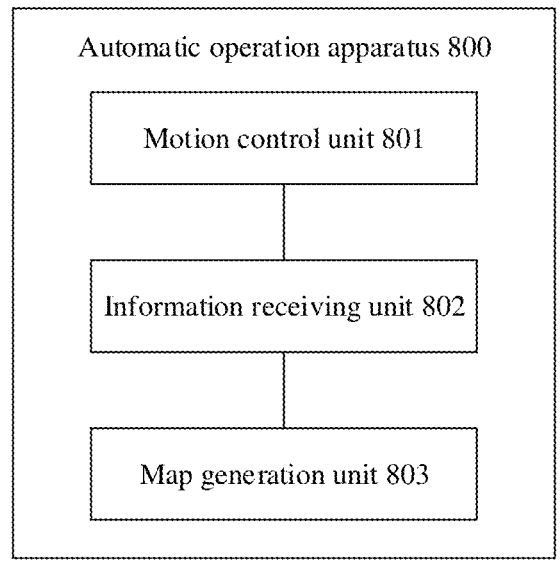
FIG. 8 is a schematic diagram of an automatic operation apparatus according to an embodiment of the disclosure.

FIG. 8 shows a schematic diagram of an automatic operation apparatus according to an embodiment of the disclosure. As shown in FIG. 8, the automatic operation apparatus 800 includes a motion control unit 801, an information receiving unit 802 and a map generation unit 803.

The motion control unit 801 is configured to control the automatic operation apparatus to move, to record, by the automatic operation apparatus, position information of multiple path points on a movement path of the automatic operation apparatus.

The information receiving unit 802 is configured to receive boundary attribute configuration information, and determine, according to the boundary attribute configuration information, boundary attributes of at least a part of multiple path points.

The map generation unit 803 is configured to generate a working map including position information of multiple boundary points and boundary attributes of at least a part of the boundary points. The position information of multiple boundary points are determined according to the position information of multiple path points, the boundary attribute of the boundary point is determined according to the boundary attribute of the path point, multiple boundary points are configured to indicate including a virtual boundary surrounding a preset area, and when the automatic operation apparatus performs operations along the virtual boundary according to the working map, working modes when the automatic operation apparatus moves to boundary points corresponding to different boundary attributes are different.

In the embodiment of the disclosure, the motion control unit 801 may collect position information of multiple path points on a movement path in a process of controlling the automatic operation apparatus to move, the information receiving unit 802 may be configured to determine boundary attributes of at least a part of the path points, and then the map generation unit 803 may generate a working map including position information of multiple boundary points and boundary attributes of at least a part of the boundary points. In this way, since working modes when the automatic operation apparatus moves to boundary points corresponding to different boundary attributes are different, setting of the boundary attributes may enable different working modes to be adopted when the automatic operation apparatus moves to at least a part of different positions of the virtual boundary to perform operations, so that the automatic operation apparatus may process areas near the virtual boundary, to reduce a possibility of requiring reworking operations. Therefore, work efficiency of the automatic operation apparatus may be improved, and individual demand of the user for operation effect of the automatic operation apparatus may also be met.

It should be noted that the automatic operation apparatus of the embodiment is configured to implement the corresponding method for generating a working map in the above method embodiments, and has advantageous effects of the corresponding method embodiment, which are not elaborated here. The automatic operation apparatus in the embodiments of the disclosure may be an automatic mowing apparatus, a sweeping robot, etc.

Figure 9:
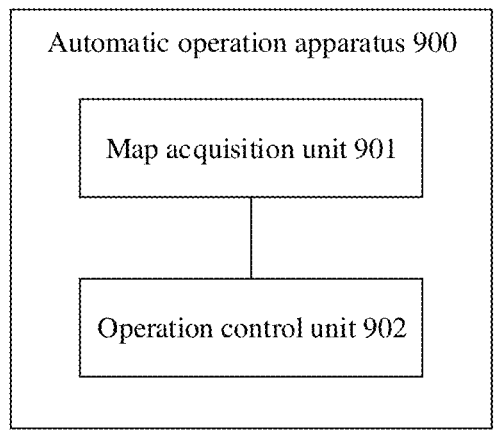
FIG. 9 is a schematic diagram of an automatic operation apparatus according to another embodiment of the disclosure.

FIG. 9 shows a schematic diagram of an automatic operation apparatus according to an embodiment of the disclosure. As shown in FIG. 9, the automatic operation apparatus 900 includes a map acquisition unit 901 and an operation control unit 902.

The map acquisition unit 901 is configured to acquire a working map, the working map includes position information of multiple boundary points and boundary attributes of at least a part of the boundary points, and multiple boundary points are configured to indicate a virtual boundary surrounding a preset area.

The operation control unit 902 is configured to control the automatic operation apparatus to perform operations along the virtual boundary according to the working map, and when the automatic operation apparatus moves to a boundary point with a boundary attribute, control the automatic operation apparatus to perform operations in a corresponding working mode according to the boundary attribute of the boundary point. Working modes when the automatic operation apparatus moves to boundary points corresponding to different boundary attributes are different.

In the embodiment of the disclosure, after the map acquisition unit 901 acquires the working map including position information of multiple boundary points and boundary attributes of at least a part of the boundary points, the operation control unit 902 controls the automatic operation apparatus to perform operations along the virtual boundary, and when the automatic operation apparatus moves to a boundary point with a boundary attribute, controls the automatic operation apparatus to perform operations in a corresponding working mode according to the boundary attribute of the boundary point. In this way, since working modes when the automatic operation apparatus moves to boundary points with different boundary attributes in the virtual boundary to perform operations are different, setting of the boundary attributes may enable different working modes to be adopted when the automatic operation apparatus moves to at least a part of different positions of the virtual boundary to perform operations, so that the automatic operation apparatus may process areas near the virtual boundary, to reduce a possibility of requiring reworking operations. Therefore, work efficiency of the automatic operation apparatus may be improved, and individual demand of the user for operation effect of the automatic operation apparatus may also be met.

The automatic operation apparatus provided in the embodiments of the disclosure may be an automatic mowing apparatus, a sweeping robot, etc. In an example, when the automatic operation apparatus is an automatic mowing apparatus, the automatic mowing apparatus may include a vision sensor configured to recognize a lawn physical boundary, and may further include a positioning sensor configured to determine position information, such as a real-time kinematic (RTK) sensor, an Inertial Measurement Unit (IMU) sensor, or a gyroscope, etc. The position information may be determined by one positioning sensor, or may be determined by fusion positioning of multiple positioning sensors, which is not limited in the embodiments of the disclosure.

It should be noted that the automatic operation apparatus of the embodiment is configured to implement the corresponding operation method in the above method embodiments, and has advantageous effects of the corresponding method embodiment, which are not elaborated here.

Figure 10:
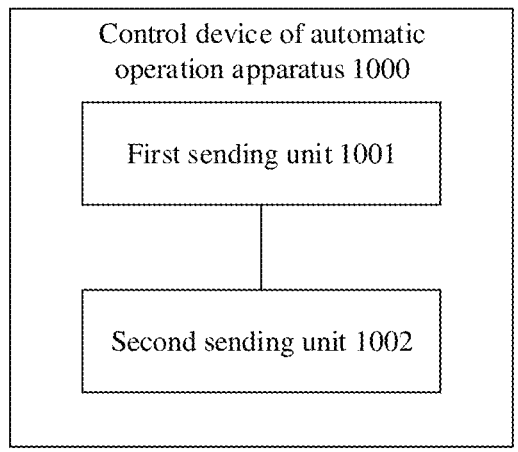
FIG. 10 is a schematic diagram of a control device of an automatic operation apparatus according to an embodiment of the disclosure.

FIG. 10 shows a schematic diagram of a control device of an automatic operation apparatus according to an embodiment of the disclosure. As shown in FIG. 10, the control device of the automatic operation apparatus 1000 includes a first sending unit 1001 and a second sending unit 1002.

The first sending unit 1001 is configured to send boundary attribute configuration information to the automatic operation apparatus.

The second sending unit 1002 is configured to send a motion control instruction to the automatic operation apparatus, to instruct the automatic operation apparatus to move, to enable the automatic operation apparatus to record position information of multiple path points on a movement path, and determine, according to the boundary attribute configuration information, boundary attributes of at least a part of multiple path points, and generate a working map including position information of multiple boundary points and boundary attributes of at least a part of the boundary points. The position information of multiple boundary points are determined according to the position information of multiple path points, the boundary attribute of the boundary point is determined according to the boundary attribute of the path point, multiple boundary points are configured to indicate including a virtual boundary surrounding a preset area, and when the automatic operation apparatus performs operations along the virtual boundary according to the working map, working modes when the automatic operation apparatus moves to boundary points corresponding to different boundary attributes are different.

In the embodiment of the disclosure, the first sending unit 1001 sends boundary attribute configuration information to the automatic operation apparatus, and the second sending unit 1002 sends a motion control instruction to the automatic operation apparatus, to instruct the automatic operation apparatus to move, to enable the automatic operation apparatus to record position information of multiple path points on a movement path, and generate a working map including position information of multiple boundary points and boundary attributes of at least a part of the boundary points. When the automatic operation apparatus performs operations along the virtual boundary according to the working map, working modes when the automatic operation apparatus moves to boundary points corresponding to different boundary attributes are different. In this way, since working modes when the automatic operation apparatus moves to boundary points corresponding to different boundary attributes are different, setting of the boundary attributes may enable different working modes to be adopted when the automatic operation apparatus moves to at least a part of different positions of the virtual boundary to perform operations, so that the automatic operation apparatus may process areas near the virtual boundary, to reduce a possibility of requiring reworking operations. Therefore, work efficiency of the automatic operation apparatus may be improved, and individual demand of the user for operation effect of the automatic operation apparatus may also be met.

It should be noted that the control device of the automatic operation apparatus of the embodiment is configured to implement the corresponding method for controlling an automatic operation apparatus in the above method embodiments, and has advantageous effects of the corresponding method embodiment, which are not elaborated here.

Figure 11:
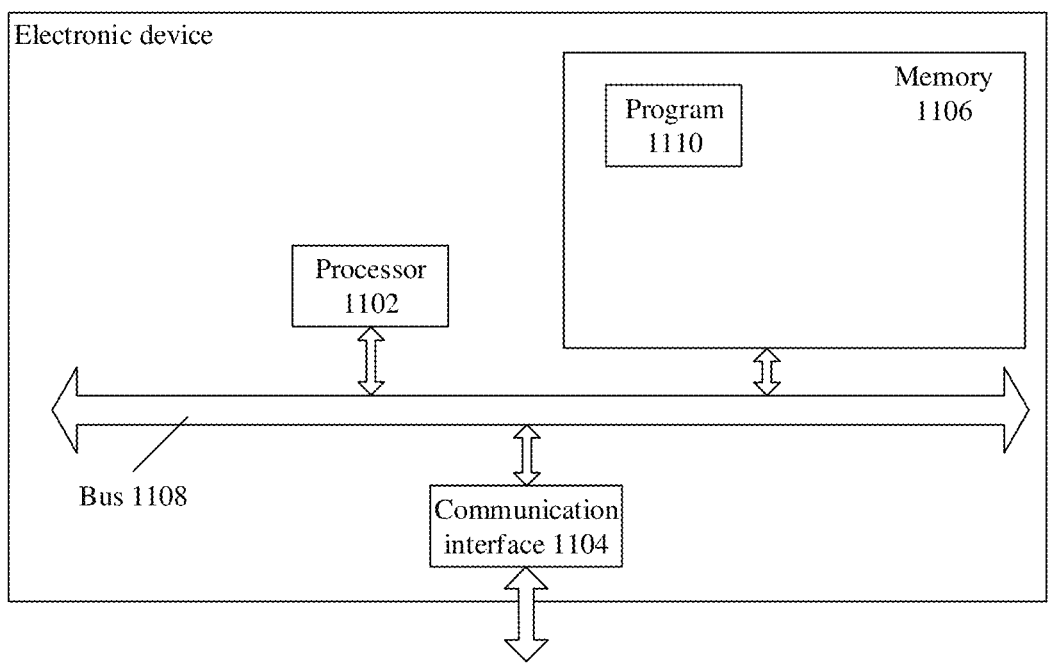
FIG. 11 is a schematic block diagram of an electronic device according to an embodiment of the disclosure.

FIG. 11 is a schematic block diagram of an electronic device provided in an embodiment of the disclosure, and specific implementation of the electronic device is not limited in specific embodiments of the disclosure. As shown in FIG. 11, the electronic device may include a processor 1102, a communication interface 1104, a memory 1106 and a communication bus 1108.

Mutual communication among the processor 1102, the communication interface 1104 and the memory 1106 is implemented through the communication bus 1108.

The communication interface 1104 is configured to communicate with other electronic devices or servers.

The processor 1102 is configured to execute a program 1110, and specifically, may perform relevant operations of the above method for generating a working map, or relevant operations of the above operation method, or relevant operations of the above method for controlling an automatic operation apparatus.

Specifically, the program 1110 may include a program code including computer operation instructions.

The processor 1102 may be a Central Processing Unit (CPU), or an Application Specific Integrated Circuit (ASIC), or one or more integrated circuits configured to implement embodiments of the disclosure. One or more processors included in a smart device may be the same type of processor, such as one or more CPUs, or may be different types of processors, such as one or more CPUs and one or more ASICs.

The memory 1106 is configured to store the program 1110. The memory 1106 may include a high-speed Random Access Memory (RAM) memory, and may also include a non-volatile memory, such as at least one magnetic disk memory.

Specifically, the program 1110 may be configured to enable the processor 1102 to perform the method for generating a working map, the operation method or the method for controlling an automatic operation apparatus in any one of the above embodiments.

Specific implementation of each operation in the program 1110 may refer to corresponding descriptions of corresponding operations and units in any one of the above embodiments of the method for generating a working map, the above embodiments of the operation method or the above embodiments of the method for controlling an automatic operation apparatus, which are not elaborated here. It may be clearly understood by those skilled in the art that for convenience and conciseness of descriptions, specific working processes of the above devices and modules may refer to descriptions of corresponding processes in the above method embodiments, which are not elaborated here.

According to the electronic device of the embodiment of the disclosure, since working modes when the automatic operation apparatus moves to boundary points corresponding to different boundary attributes are different, setting of the boundary attributes may enable different working modes to be adopted when the automatic operation apparatus moves to at least a part of different positions of the virtual boundary to perform operations, so that the automatic operation apparatus may process areas near the virtual boundary, to reduce a possibility of requiring reworking operations. Therefore, work efficiency of the automatic operation apparatus may be improved, and individual demand of the user for operation effect of the automatic operation apparatus may also be met.

The disclosure further provides a computer-readable storage medium, the computer-readable storage medium stores instructions which are configured to enable a machine to perform the method for generating a working map, the operation method or the method for controlling an automatic operation apparatus as described here. Specifically, a system or apparatus equipped with a storage medium may be provided, a software program code for implementing functions of any one of the above embodiments is stored in the storage medium, and enables a computer (or CPU or Microprocessor Unit (MPU)) of the system or apparatus to read and execute the program code stored in the storage medium.

In this case, the program code itself read from the storage medium may implement functions of any one of the above embodiments, and thus the program code and the storage medium storing the program code constitute a part of the disclosure.

Embodiments of the storage medium configured to provide the program code include a floppy disk, a hard disk, a magneto-optical disk, an optical disk (such as Compact Disk Read Only Memory (CD-ROM), Compact Disk-Recordable (CD-R), Compact Disk-ReWritable (CD-RW), Digital Video Disk Read Only Memory (DVD-ROM), Digital Video Disk Random Access Memory (DVD-RAM), Digital Video Disk-ReWritable (DVD-RW), Digital Video Disk+ReWritable (DVD+RW)), a magnetic tape, a non-volatile memory card, and a Read Only Memory (ROM). Alternatively, the program code may be downloaded from a server computer through a communication network.

An embodiment of the disclosure further provides a computer program product, the computer program product includes computer instructions which instruct a computing device to perform operations corresponding to any one of the above multiple method embodiments.

It should be pointed out that according to requirements of implementation, each component/step described in the embodiments of the disclosure may be split into more components/steps, or two or more components/steps or a part of operations of the components/steps may be combined into a new component/step, to achieve the purpose of the embodiments of the disclosure.

The above methods according to the embodiments of the disclosure may be implemented in hardware and firmware, or may be implemented as a software or computer code which may be stored in a recording medium (such as a CD-ROM, a RAM, a floppy disk, a hard disk, or a magneto-optical disk), or may be implemented as a computer code which is downloaded through a network, originally stored in a remote recording medium or a non-transitory machine-readable medium, and will be stored in a local recording medium. Therefore, the methods described here may be processed by such software stored on a recording medium using a general-purpose computer, a special-purpose processor, or programmable or special purpose hardware (such as an ASIC or Field Programmable Gate Array (FPGA)). It may be understood that a computer, processor, microprocessor controller or programmable hardware includes a storage component (such as RAM, ROM, flash memory, etc.) which may store or receive a software or computer code, and when the software or computer code is accessed and executed by the computer, processor or hardware, the methods described here are implemented. Furthermore, when a general-purpose computer accesses a code configured to implement the methods shown here, execution of the code converts the general-purpose computer into a special-purpose computer configured to perform the methods shown here.

It may be appreciated by those of ordinary skill in the art that units and method steps of various examples described with reference to the embodiments disclosed here may be implemented in electronic hardware, or a combination of computer software and electronic hardware. Whether these functions are performed in hardware or software, depends on specific applications and design constraints of the technical solutions. Technicians may use different methods for each specific application, to implement the described functions; however, such implementation should not be considered as going beyond the scope of the embodiments of the disclosure.

The above implementations are only intended to describe the embodiments of the disclosure, rather than limiting the embodiments of the disclosure. Those of ordinary skill in relevant technical fields may also make various variations and modifications without departing from the spirit and scope of the embodiments of the disclosure. Therefore, all equivalent technical solutions also fall within the scope of the embodiments of the disclosure, and the patent scope of protection of the embodiments of the disclosure should be limited by the claims.

The invention claimed is:

1. A method for generating a working map, applied to an automatic operation apparatus, comprising:
controlling the automatic operation apparatus to move, to record, by the automatic operation apparatus, position information of a plurality of path points on a movement path of the automatic operation apparatus;
receiving boundary attribute configuration information, and determining, according to the boundary attribute configuration information, boundary attributes of at least a part of the plurality of path points; and
generating a working map comprising position information of a plurality of boundary points and boundary attributes of at least a part of the plurality of boundary points, wherein the position information of the plurality of boundary points are determined according to the position information of the plurality of path points, a boundary attribute of a boundary point is determined according to the boundary attribute of the path point, the plurality of boundary points are configured to indicate comprising a virtual boundary surrounding a preset area, and when the automatic operation apparatus performs operations along the virtual boundary according to the working map, working modes when the automatic operation apparatus moves to boundary points corresponding to different boundary attributes are different,
wherein the boundary attribute of the boundary point is configured to indicate a relative position relationship between an operation path of the automatic operation apparatus and the virtual boundary when the automatic operation apparatus moves to a boundary segment where the boundary point is located in the virtual boundary to perform operations; or
the boundary attribute of the boundary point is configured to indicate a relative position relationship between the operation path of the automatic operation apparatus and a physical boundary when the automatic operation apparatus moves to the boundary segment where the boundary point is located in the virtual boundary to perform operations.

2. The method of claim 1, wherein determining, according to the boundary attribute configuration information, boundary attributes of at least the part of the plurality of path points comprises:
when the automatic operation apparatus determines a path point, determining a boundary attribute, indicated by a most recently received boundary attribute configuration information, as the boundary attribute of the path point.

3. The method of claim 1, wherein determining, according to the boundary attribute configuration information, boundary attributes of at least the part of the plurality of path points comprises:
after receiving the boundary attribute configuration information, determining a boundary attribute of a first path point determined after the boundary attribute configuration information is received, as a boundary attribute indicated by the boundary attribute configuration information.

4. The method of claim 1, wherein controlling the automatic operation apparatus to move comprises:
controlling, according to a control command from an external control device, the automatic operation apparatus to move.

5. The method of claim 4, further comprising in a process of controlling, according to the control command from the external control device, the automatic operation apparatus to move:
if a boundary attribute indicated by the most recently received boundary attribute configuration information is a first boundary attribute, sending a prompt information to the control device when a physical boundary is recognized and the automatic operation apparatus does not straddle the physical boundary, wherein the prompt information is configured to prompt a user to control the automatic operation apparatus to move by straddling the physical boundary.

6. The method of claim 1, wherein the virtual boundary comprises a first boundary point and a second boundary point adjacent to each other, the first boundary point and the second boundary point correspond to different boundary attributes, and when the automatic operation apparatus performs operations along the virtual boundary, and the automatic operation apparatus moves from a first boundary segment where the first boundary point is located to a second boundary segment where the second boundary point is located, a distance between an operation path of the automatic operation apparatus and a physical boundary changes from a first distance to a second distance.

7. The method of claim 6, wherein a transition path segment is provided between the first boundary segment and the second boundary segment, an end of the transition path segment is connected to a terminal end of the first boundary segment, and another end of the transition path segment is connected to a head end of the second boundary segment.

8. The method of claim 1, wherein controlling the automatic operation apparatus to move comprises:
if the automatic operation apparatus recognizes a physical boundary meeting an autonomous movement condition, controlling the automatic operation apparatus to autonomously move along the physical boundary.

9. The method of claim 8, wherein the boundary attributes comprise at least two of a first boundary attribute, a second boundary attribute and a third boundary attribute, and after the working map is generated:
if a boundary attribute of a boundary point is the first boundary attribute, the automatic operation apparatus is controlled to perform operations in a first working mode, so that when the automatic operation apparatus moves to the boundary point to perform operations, if a boundary segment where the boundary point is located in the virtual boundary is a physical boundary, the automatic operation apparatus is controlled to straddle the boundary segment where the boundary point is located to perform operations, and if the boundary segment where the boundary point is located in the virtual boundary is not the physical boundary, the automatic operation apparatus is controlled to move toward an area outside the preset area to perform operations;
if the boundary attribute of the boundary point is the second boundary attribute, the automatic operation apparatus is controlled to perform operations in a second working mode, so that when the automatic operation apparatus moves to the boundary point to perform operations, if a boundary segment where the boundary point is located in the virtual boundary is a physical boundary, the automatic operation apparatus is controlled to perform operations, in the preset area, along the boundary segment where the boundary point is located, and if the boundary segment where the boundary point is located in the virtual boundary is not the physical boundary, the automatic operation apparatus is controlled to move toward an area outside the preset area to perform operations; and
if the boundary attribute of the boundary point is the third boundary attribute, the automatic operation apparatus is controlled to perform operations in a third working mode, so that when the automatic operation apparatus moves to the boundary point to perform operations, the automatic operation apparatus moves, in the preset area, along a virtual boundary where the boundary point is located, to performs operations.

10. The method of claim 9, wherein controlling the automatic operation apparatus to autonomously move along the physical boundary comprises:
if a boundary attribute indicated by the most recently received boundary attribute configuration information is the first boundary attribute, controlling the automatic operation apparatus to straddle the physical boundary and autonomously move along the physical boundary; and
if the boundary attribute indicated by the most recently received boundary attribute configuration information is the second boundary attribute or the third boundary attribute, controlling the automatic operation apparatus to autonomously move along the physical boundary in an area surrounded by the physical boundary.

11. An operation method, applied to an automatic operation apparatus, comprising:
acquiring a working map, wherein the working map comprises position information of a plurality of boundary points and boundary attributes of at least a part of the plurality of boundary points, and the plurality of boundary points are configured to indicate a virtual boundary surrounding a preset area; and
controlling, according to the working map, the automatic operation apparatus to perform operations along the virtual boundary, and when the automatic operation apparatus moves to a boundary point with a boundary attribute, controlling, according to the boundary attribute of the boundary point, the automatic operation apparatus to perform operations in a corresponding working mode, wherein working modes when the automatic operation apparatus moves to boundary points corresponding to different boundary attributes are different,
wherein the boundary attribute of the boundary point is configured to indicate a relative position relationship between an operation path of the automatic operation apparatus and the virtual boundary when the automatic operation apparatus moves to a boundary segment where the boundary point is located in the virtual boundary to perform operations; or
the boundary attribute of the boundary point is configured to indicate a relative position relationship between the operation path of the automatic operation apparatus and a physical boundary, when the automatic operation apparatus moves to the boundary segment where the boundary point is located in the virtual boundary to perform operations.

12. The method of claim 11, wherein controlling the automatic operation apparatus to perform operations in the corresponding working mode according to the boundary attribute of the boundary point comprises:
if the boundary attribute of the boundary point is a second boundary attribute, controlling the automatic operation apparatus to perform operations in a second working mode, wherein when the automatic operation apparatus performs operations in the second working mode, if a boundary segment where the boundary point is located in the virtual boundary is a physical boundary, the automatic operation apparatus is controlled to perform operations, in the preset area, along the boundary segment where the boundary point is located, and if the boundary segment where the boundary point is located in the virtual boundary is not the physical boundary, the automatic operation apparatus is controlled to move toward an area outside the preset area to perform operations.

13. The method of claim 11, wherein controlling, according to the boundary attribute of the boundary point, the automatic operation apparatus to perform operations in the corresponding working mode comprises:
if the boundary attribute of the boundary point is a third boundary attribute, controlling the automatic operation apparatus to perform operations in a third working mode, so that the automatic operation apparatus performs operations, in the preset area, along the boundary segment where the boundary point is located.

14. The method of claim 11, wherein acquiring the working map comprises:
acquiring an initial map, wherein the initial map comprises the position information of the plurality of boundary points, and the plurality of boundary points are configured to indicate the virtual boundary surrounding the preset area;
configuring boundary attributes for at least a part of the plurality of boundary points in the initial map; and
generating the working map comprising the position information of the plurality of boundary points and the boundary attributes of at least the part of the plurality of boundary points.

15. The method of claim 14, wherein the initial map comprises: a map generated from a movement path when the automatic operation apparatus is remotely controlled to move, a map generated from a movement path when the automatic operation apparatus moves autonomously, a map drawn by a user, or a map created in advance.

16. The method of claim 11, wherein controlling, according to the boundary attribute of the boundary point, the automatic operation apparatus to perform operations in the corresponding working mode comprises:
if the boundary attribute of the boundary point is a first boundary attribute, controlling the automatic operation apparatus to perform operations in a first working mode, wherein when the automatic operation apparatus performs operations in the first working mode, if a boundary segment where the boundary point is located in the virtual boundary is a physical boundary, the automatic operation apparatus is controlled to straddle the boundary segment where the boundary point is located to perform operations, and if the boundary segment where the boundary point is located in the virtual boundary is not the physical boundary, the automatic operation apparatus is controlled to move toward an area outside the preset area to perform operations.

17. The method of claim 16, wherein controlling the automatic operation apparatus to move toward the area outside the preset area to perform operations comprises:
if a distance between a physical boundary outside the boundary segment where the boundary point is located and the boundary segment where the boundary point is located is less than or equal to a third distance, controlling the automatic operation apparatus to perform operations along the physical boundary outside the boundary segment where the boundary point is located; and
if the distance between the physical boundary outside the boundary segment where the boundary point is located and the boundary segment where the boundary point is located is greater than the third distance, controlling the automatic operation apparatus to perform operations along an extended path, wherein a distance between the extended path and the boundary segment where the boundary point is located is equal to the third distance.

18. The method of claim 11, further comprising:
when the automatic operation apparatus moves from a first boundary segment where a first boundary point is located to a second boundary segment where a second boundary point is located, controlling a distance between an operation path of the automatic operation apparatus and a physical boundary to be changed from a first distance to a second distance, wherein the first boundary point and the second boundary point are adjacent boundary points in the virtual boundary, and the first boundary point and the second boundary point correspond to different boundary attributes.

19. The method of claim 18, wherein when the automatic operation apparatus moves from the first boundary segment to the second boundary segment, the automatic operation apparatus moves from a terminal end of the first boundary segment to an end of a transition path segment, and moves from another end of the transition path segment to a head end of the second boundary segment.

20. A method for controlling an automatic operation apparatus, applied to a control device external to the automatic operation apparatus, comprising:
sending boundary attribute configuration information to the automatic operation apparatus; and
sending a motion control instruction to the automatic operation apparatus, to instruct the automatic operation apparatus to move, to enable the automatic operation apparatus to record position information of a plurality of path points on a movement path, and determine, according to the boundary attribute configuration information, boundary attributes of at least a part of the plurality of path points, and generate a working map comprising position information of a plurality of boundary points and boundary attributes of at least a part of the plurality of boundary points, wherein the position information of the plurality of boundary points are determined according to the position information of the plurality of path points, a boundary attribute of a boundary point is determined according to the boundary attribute of the path point, the plurality of boundary points are configured to indicate comprising a virtual boundary surrounding a preset area, and when the automatic operation apparatus performs operations along the virtual boundary according to the working map, working modes when the automatic operation apparatus moves to boundary points corresponding to different boundary attributes are different,
wherein the boundary attribute of the boundary point is configured to indicate a relative position relationship between an operation path of the automatic operation apparatus and the virtual boundary when the automatic operation apparatus moves to a boundary segment where the boundary point is located in the virtual boundary to perform operations; or
the boundary attribute of the boundary point is configured to indicate a relative position relationship between the operation path of the automatic operation apparatus and a physical boundary when the automatic operation apparatus moves to the boundary segment where the boundary point is located in the virtual boundary to perform operations.

21. The method of claim 20, wherein sending the motion control instruction to the automatic operation apparatus comprises:
sending a first motion control instruction to the automatic operation apparatus, in response to a first motion control of the control device being triggered, wherein the first motion control instruction comprises at least one of a motion direction parameter, a motion speed parameter, or a motion acceleration parameter; and/or
after receiving an autonomous movement request from the automatic operation apparatus, sending a second motion control instruction to the automatic operation apparatus in response to a second motion control of the control device being triggered, wherein the autonomous movement request is sent by the automatic operation apparatus to the control device when a physical boundary meeting an autonomous movement condition is recognized, and the second motion control instruction is configured to instruct the automatic operation apparatus to autonomously move along the recognized physical boundary meeting the autonomous movement condition.

22. The method of claim 20, further comprising:
sending an operation instruction to the automatic operation apparatus in response to an operation control of the control device being triggered, wherein the operation instruction is configured to instruct the automatic operation apparatus to perform operations according to the working map, and send positioning information to the control device, the positioning information is configured to indicate a position where the automatic operation apparatus is located during the operations;
receiving the positioning information from the automatic operation apparatus; and
displaying, in a display interface of the control device, the position of the automatic operation apparatus according to the positioning information.

23. The method of claim 20, wherein the boundary attributes comprise at least two of a first boundary attribute, a second boundary attribute and a third boundary attribute,
if a boundary attribute of a boundary point is the first boundary attribute, the automatic operation apparatus is controlled to perform operations in a first working mode, so that when the automatic operation apparatus moves to the boundary point to perform operations, if a boundary segment where the boundary point is located in the virtual boundary is a physical boundary, the automatic operation apparatus is controlled to straddle the boundary segment where the boundary point is located to perform operations, and if the boundary segment where the boundary point is located in the virtual boundary is not the physical boundary, the automatic operation apparatus is controlled to move toward an area outside the preset area to perform operations;

if the boundary attribute of the boundary point is the second boundary attribute, the automatic operation apparatus is controlled to perform operations in a second working mode, so that when the automatic operation apparatus moves to the boundary point to perform operations, if a boundary segment where the boundary point is located in the virtual boundary is a physical boundary, the automatic operation apparatus is controlled to perform operations, in the preset area, along the boundary segment where the boundary point is located, and if the boundary segment where the boundary point is located in the virtual boundary is not the physical boundary, the automatic operation apparatus is controlled to move toward an area outside the preset area to perform operations;

if the boundary attribute of the boundary point is the third boundary attribute, the automatic operation apparatus is controlled to perform operations in a third working mode, so that when the automatic operation apparatus moves to the boundary point to perform operations, the automatic operation apparatus moves, in the preset area, along a virtual boundary where the boundary point is located, to performs operations.

24. The method of claim 20, further comprising:
receiving position information of a path point sent by the automatic operation apparatus;
determining a previous path point of a current path point according to an order in which the automatic operation apparatus moves to different path points, wherein the current path point is not a first path point from which the automatic operation apparatus moves; and
displaying, in a display interface of the control device, a connection line between the current path point and the previous path point by a line pattern corresponding to a boundary attribute of the current path point, wherein line patterns corresponding to different boundary attributes are different.

25. The method of claim 24, further comprising:
receiving boundary attribute configuration information of the path points sent by the automatic operation apparatus, and determining a boundary attribute of the current path point according to boundary attribute configuration information of the current path point; or
determining boundary attribute configuration information sent to the automatic operation apparatus most recently before the automatic operation apparatus records position information of the current path point, and determining a boundary attribute indicated by the boundary attribute configuration information as the boundary attribute of the current path point.

26. The method of claim 20, wherein sending the boundary attribute configuration information to the automatic operation apparatus comprises:
sending the boundary attribute configuration information to the automatic operation apparatus, in response to a mapping control or an attribute control of the control device being triggered.

27. The method of claim 26, wherein sending the boundary attribute configuration information to the automatic operation apparatus, in response to the attribute control being triggered comprises:
sending the boundary attribute configuration information to the automatic operation apparatus, in response to each time the attribute control being triggered, wherein the boundary attribute configuration information sent to the automatic operation apparatus in two adjacent times indicate same or different boundary attributes.

28. The method of claim 26, wherein when the automatic operation apparatus determines the boundary attribute of the path point, the boundary attribute of the path point is determined according to the most recently received boundary attribute configuration information,
a plurality of attribute controls are provided, different attribute configuration information are sent to the automatic operation apparatus when different attribute controls are triggered, and boundary attributes indicated by different boundary attribute configuration information are different, or
one attribute control is provided, and when the attribute control is triggered, one piece of attribute configuration information is circularly selected from a plurality of different pieces of attribute configuration information in a preset order and sent to the automatic operation apparatus, and boundary attributes indicated by different boundary attribute configuration information are different.

29. An automatic operation apparatus, comprising:
a motion control unit, configured to control the automatic operation apparatus to move, to record, by the automatic operation apparatus, position information of a plurality of path points on a movement path of the automatic operation apparatus;
an information receiving unit, configured to receive boundary attribute configuration information, and determine, according to the boundary attribute configuration information, boundary attributes of at least a part of the plurality of path points; and
a map generation unit, configured to generate a working map comprising position information of a plurality of boundary points and boundary attributes of at least a part of the plurality of boundary points, wherein the position information of the plurality of boundary points are determined according to the position information of the plurality of path points, a boundary attribute of a boundary point is determined according to the boundary attribute of the path point, the plurality of boundary points are configured to indicate comprising a virtual boundary surrounding a preset area, and when the automatic operation apparatus performs operations along the virtual boundary according to the working map, working modes when the automatic operation apparatus moves to boundary points corresponding to different boundary attributes are different,
wherein the boundary attribute of the boundary point is configured to indicate a relative position relationship between an operation path of the automatic operation apparatus and the virtual boundary when the automatic operation apparatus moves to a boundary segment where the boundary point is located in the virtual boundary to perform operations; or
the boundary attribute of the boundary point is configured to indicate a relative position relationship between the operation path of the automatic operation apparatus and an physical boundary when the automatic operation apparatus moves to the boundary segment where the boundary point is located in the virtual boundary to perform operations.

30. An automatic operation apparatus, comprising:
a map acquisition unit, configured to acquire a working map, wherein the working map comprises position information of a plurality of boundary points and boundary attributes of at least a part of the plurality of boundary points, and the plurality of boundary points are configured to indicate a virtual boundary surrounding a preset area; and
an operation control unit, configured to control the automatic operation apparatus to perform operations along the virtual boundary according to the working map, and when the automatic operation apparatus moves to a boundary point with a boundary attribute, control the automatic operation apparatus to perform operations in a corresponding working mode according to the boundary attribute of the boundary point, wherein working modes when the automatic operation apparatus moves to boundary points corresponding to different boundary attributes are different,
wherein the boundary attribute of the boundary point is configured to indicate a relative position relationship between an operation path of the automatic operation apparatus and the virtual boundary when the automatic operation apparatus moves to a boundary segment where the boundary point is located in the virtual boundary to perform operations; or
the boundary attribute of the boundary point is configured to indicate a relative position relationship between the operation path of the automatic operation apparatus and a physical boundary, when the automatic operation apparatus moves to the boundary segment where the boundary point is located in the virtual boundary to perform operations.

31. A control device of an automatic operation apparatus, comprising:
a first sending unit, configured to send boundary attribute configuration information to the automatic operation apparatus; and
a second sending unit, configured to send a motion control instruction to the automatic operation apparatus, to instruct the automatic operation apparatus to move, to enable the automatic operation apparatus to record position information of a plurality of path points on a movement path, and determine, according to the boundary attribute configuration information, boundary attributes of at least a part of the plurality of path points, and generate a working map comprising position information of a plurality of boundary points and boundary attributes of at least a part of the plurality of boundary points, wherein the position information of the plurality of boundary points are determined according to the position information of the plurality of path points, a boundary attribute of a boundary point is determined according to the boundary attribute of the path point, the plurality of boundary points are configured to indicate comprising a virtual boundary surrounding a preset area, and when the automatic operation apparatus performs operations along the virtual boundary according to the working map, working modes when the automatic operation apparatus moves to boundary points corresponding to different boundary attributes are different,
wherein the boundary attribute of the boundary point is configured to indicate a relative position relationship between an operation path of the automatic operation apparatus and the virtual boundary when the automatic operation apparatus moves to a boundary segment where the boundary point is located in the virtual boundary to perform operations; or
the boundary attribute of the boundary point is configured to indicate a relative position relationship between the operation path of the automatic operation apparatus and a physical boundary when the automatic operation apparatus moves to the boundary segment where the boundary point is located in the virtual boundary to perform operations.

32. A computer storage medium, having stored thereon a computer program, wherein when the program is executed by a processor, the processor is caused to perform:
controlling an automatic operation apparatus to move, to record, by the automatic operation apparatus, position information of a plurality of path points on a movement path of the automatic operation apparatus;
receiving boundary attribute configuration information, and determining, according to the boundary attribute configuration information, boundary attributes of at least a part of the plurality of path points; and
generating a working map comprising position information of a plurality of boundary points and boundary attributes of at least a part of the plurality of boundary points, wherein the position information of the plurality of boundary points are determined according to the position information of the plurality of path points, a boundary attribute of a boundary point is determined according to the boundary attribute of the path point, the plurality of boundary points are configured to indicate comprising a virtual boundary surrounding a preset area, and when the automatic operation apparatus performs operations along the virtual boundary according to the working map, working modes when the automatic operation apparatus moves to boundary points corresponding to different boundary attributes are different,
wherein the boundary attribute of the boundary point is configured to indicate a relative position relationship between an operation path of the automatic operation apparatus and the virtual boundary when the automatic operation apparatus moves to a boundary segment where the boundary point is located in the virtual boundary to perform operations; or
the boundary attribute of the boundary point is configured to indicate a relative position relationship between the operation path of the automatic operation apparatus and a physical boundary when the automatic operation apparatus moves to the boundary segment where the boundary point is located in the virtual boundary to perform operations.

33. A computer storage medium, having stored thereon a computer program, wherein when the program is executed by a processor, the processor is caused to perform:
acquiring a working map, wherein the working map comprises position information of a plurality of boundary points and boundary attributes of at least a part of the plurality of boundary points, and the plurality of boundary points are configured to indicate a virtual boundary surrounding a preset area; and
controlling, according to the working map, an automatic operation apparatus to perform operations along the virtual boundary, and when the automatic operation apparatus moves to a boundary point with a boundary attribute, controlling, according to the boundary attribute of the boundary point, the automatic operation apparatus to perform operations in a corresponding working mode, wherein working modes when the automatic operation apparatus moves to boundary points corresponding to different boundary attributes are different, wherein the boundary attribute of the boundary point is configured to indicate a relative position relationship between an operation path of the automatic operation apparatus and the virtual boundary when the automatic operation apparatus moves to a boundary segment where the boundary point is located in the virtual boundary to perform operations; or the boundary attribute of the boundary point is configured to indicate a relative position relationship between the operation path of the automatic operation apparatus and a physical boundary, when the automatic operation apparatus moves to the boundary segment where the boundary point is located in the virtual boundary to perform operations.

34. A computer storage medium, having stored thereon a computer program, wherein when the program is executed by a processor, the processor is caused to perform:

sending boundary attribute configuration information to an automatic operation apparatus; and sending a motion control instruction to the automatic operation apparatus, to instruct the automatic operation apparatus to move, to enable the automatic operation apparatus to record position information of a plurality of path points on a movement path, and determine, according to the boundary attribute configuration information, boundary attributes of at least a part of the plurality of path points, and generate a working map comprising position information of a plurality of boundary points and boundary attributes of at least a part of the plurality of boundary points, wherein the position information of the plurality of boundary points are determined according to the position information of the plurality of path points, a boundary attribute of a boundary point is determined according to the boundary attribute of the path point, the plurality of boundary points are configured to indicate comprising a virtual boundary surrounding a preset area, and when the automatic operation apparatus performs operations along the virtual boundary according to the working map, working modes when the automatic operation apparatus moves to boundary points corresponding to different boundary attributes are different, wherein the boundary attribute of the boundary point is configured to indicate a relative position relationship between an operation path of the automatic operation apparatus and the virtual boundary when the automatic operation apparatus moves to a boundary segment where the boundary point is located in the virtual boundary to perform operations; or the boundary attribute of the boundary point is configured to indicate a relative position relationship between the operation path of the automatic operation apparatus and a physical boundary when the automatic operation apparatus moves to the boundary segment where the boundary point is located in the virtual boundary to perform operations.

* * * * *